United States Patent
Simpson et al.

(10) Patent No.: US 11,426,942 B2
(45) Date of Patent: Aug. 30, 2022

(54) MANUFACTURING SYSTEMS WITH COOLANT SUPPLY SYSTEMS AND RELATED METHODS

(71) Applicant: The Boeing Company, Chicago, IL (US)

(72) Inventors: Andrew P. Simpson, Jerseyville, IL (US); Eric E. Thomas, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 488 days.

(21) Appl. No.: 16/384,581

(22) Filed: Apr. 15, 2019

(65) Prior Publication Data
US 2020/0324484 A1 Oct. 15, 2020

(51) Int. Cl.
*B29C 64/393* (2017.01)
*B29C 64/245* (2017.01)
(Continued)

(52) U.S. Cl.
CPC .......... *B29C 64/393* (2017.08); *B29C 64/245* (2017.08); *B33Y 10/00* (2014.12); *B33Y 30/00* (2014.12); *B33Y 50/02* (2014.12)

(58) Field of Classification Search
CPC ..... B29C 64/393; B29C 64/245; B33Y 10/00; B33Y 30/00; B33Y 50/02; B33Y 40/00;
(Continued)

(56) References Cited

U.S. PATENT DOCUMENTS

| 4,445,956 A | 5/1984 | Freeman et al. |
| 4,685,660 A | 8/1987 | Dillner |

(Continued)

FOREIGN PATENT DOCUMENTS

| CN | 106964993 | 7/2017 |
| KR | 20160079313 | 7/2016 |
| WO | WO 8707863 | 12/1987 |

OTHER PUBLICATIONS

European Patent Office, Extended European Search Report for related European Patent Application No. 20157285, dated Aug. 31, 2020.
(Continued)

*Primary Examiner* — Rebecca Janssen
(74) *Attorney, Agent, or Firm* — Dascenzo Gates Intellectual Property Law, P.C.

(57) ABSTRACT

Manufacturing systems with coolant supply systems and related methods. A manufacturing system includes an additive manufacturing (AM) assembly, a milling assembly, and a coolant supply system. The AM assembly includes a support assembly that supports a build component and that is in thermal communication with the build component. The coolant supply system is configured to remove heat from the support assembly by flowing the coolant through at least a portion of the support assembly. A method of operating a manufacturing system during a manufacturing process includes detecting a manufacturing mode of the manufacturing system, forming a build component via the manufacturing process, and, at least partially concurrent with the forming the build component, selectively supplying a coolant to a support assembly and/or a milling tool. The selectively supplying the coolant is based, at least in part, on the detecting the manufacturing mode.

21 Claims, 5 Drawing Sheets

(51) Int. Cl.
  *B33Y 10/00*        (2015.01)
  *B33Y 30/00*        (2015.01)
  *B33Y 50/02*        (2015.01)

(58) Field of Classification Search
  CPC ........... G05B 2219/49021; G05B 2219/49016; G05B 19/4099; B23P 23/04; B23Q 11/10; B22F 3/105; B22F 3/24; B22F 2003/1051; B22F 2003/247
  See application file for complete search history.

(56) References Cited

U.S. PATENT DOCUMENTS

| | | | | |
|---|---|---|---|---|
| 6,634,835 | B1* | 10/2003 | Smith | B23F 21/166 |
| | | | | 407/11 |
| 6,902,360 | B2 | 6/2005 | Meece et al. | |
| 7,074,695 | B2 | 7/2006 | Park et al. | |
| 10,632,611 | B2 | 4/2020 | Morimura | |
| 2005/0173380 | A1* | 8/2005 | Carbone | B23K 26/34 |
| | | | | 219/121.31 |
| 2018/0022026 | A1* | 1/2018 | Compton | B29C 64/20 |
| | | | | 264/54 |
| 2018/0200850 | A1* | 7/2018 | Kurek | B23Q 1/015 |

OTHER PUBLICATIONS

Machine-generated English language translation of the abstract of CN 106964993, downloaded from Espcenet.com on Sep. 25, 2020.
Machine-generated English language translation of the abstract of KR 20160079313, downloaded from Espacenet.com on Aug. 7, 2020.

* cited by examiner

MANUFACTURING SYSTEMS WITH COOLANT SUPPLY SYSTEMS AND RELATED METHODS

FIELD

The present disclosure relates to manufacturing systems with coolant supply systems and related methods.

BACKGROUND

Additive manufacturing processes often utilize energy sources to add thermal energy to a bulk material, such as to melt or sinter the bulk material to form a build component. During formation of a build component, it may be desirable to control and/or regulate a temperature of the build component. For example, if the build component reaches a sufficiently high temperature, it may be difficult to control the dimensional stability of the build component, and/or the build component may exhibit undesirable microstructural properties. Alternatively, regulating the build component temperature by intermittently interrupting the energy source may introduce undesirable delays into the additive manufacturing process.

SUMMARY

Manufacturing systems with coolant supply systems and related methods are disclosed herein. A manufacturing system according to the present disclosure may include an additive manufacturing (AM) assembly configured to at least partially form a first build component via an AM process, a milling assembly configured to at least partially form a second build component via a milling process, and a coolant supply system configured to selectively supply a coolant to each of the AM assembly and the milling assembly. The AM assembly may include a support assembly that supports the first build component and that is in thermal communication with the first build component as the first build component is manufactured. The coolant supply system may be configured to remove heat from the support assembly as the first build component is manufactured by flowing the coolant through at least a portion of the support assembly to regulate a temperature of the build component.

A method of operating a manufacturing system during a manufacturing process, according to the present disclosure, may include detecting a manufacturing mode of the manufacturing system and forming a build component via the manufacturing process. The method additionally may include, at least partially concurrent with the forming the build component, selectively supplying a coolant to a support assembly that supports the build component and/or a milling tool that at least partially forms the build component during a milling process. The selectively supplying the coolant may be based, at least in part, on the detecting the manufacturing mode.

DESCRIPTION

Figure 1:
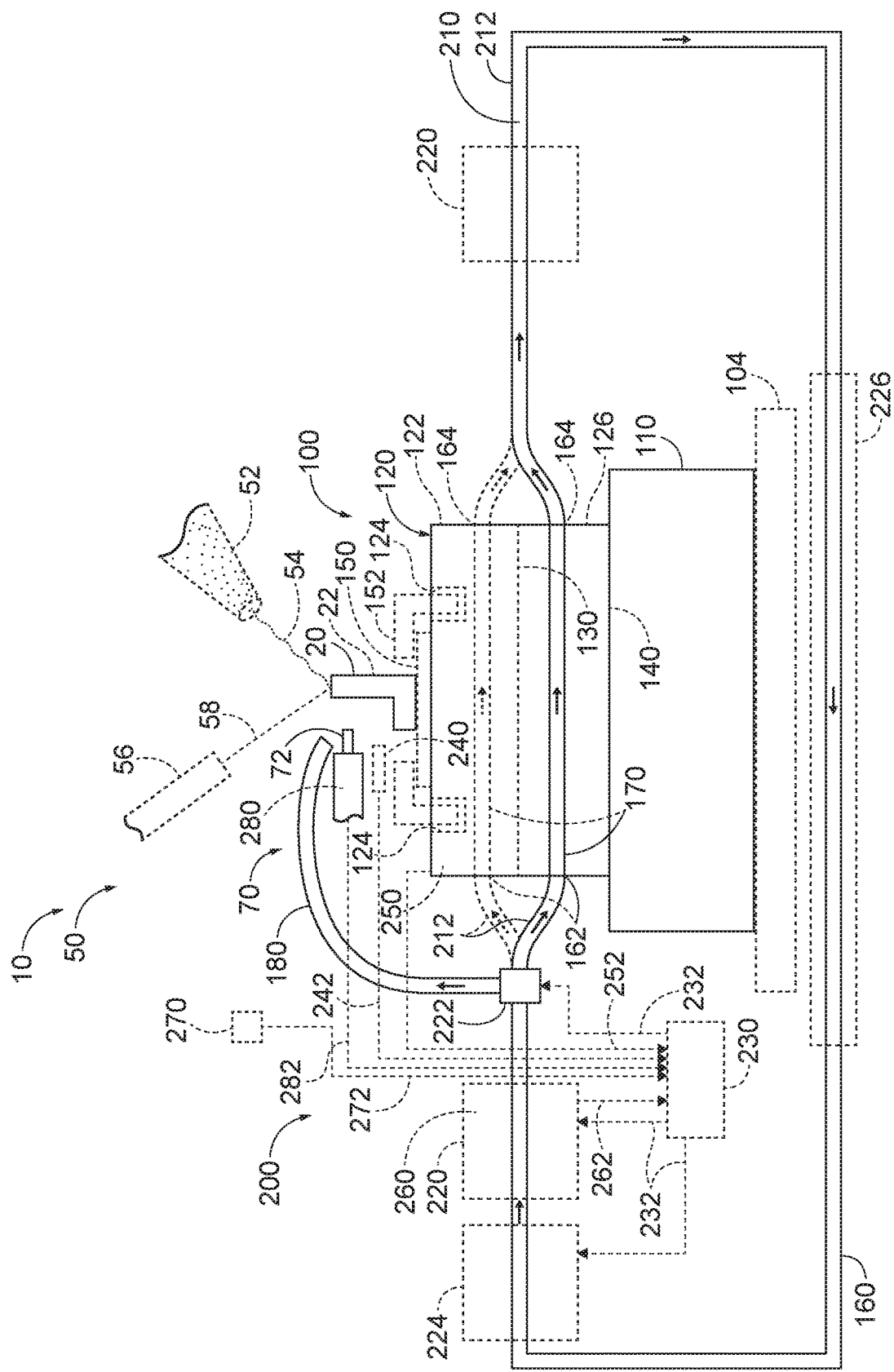
FIG. 1 is a schematic side elevation view representing examples of manufacturing systems according to the present disclosure.

FIGS. 1-5 provide illustrative, non-exclusive examples of manufacturing systems 10 for manufacturing a first build component 20 and/or a second build component 22 and/or of methods 300 of operating a manufacturing system 10, according to the present disclosure. Elements that serve a similar, or at least substantially similar, purpose are labeled with like numbers in each of FIGS. 1-5, and these elements may not be discussed in detail herein with reference to each of FIGS. 1-5. Similarly, all elements may not be labeled in each of FIGS. 1-5, but reference numerals associated therewith may be utilized herein for consistency. Elements, components, and/or features that are discussed herein with reference to one or more of FIGS. 1-5 may be included in and/or utilized with any of FIGS. 1-5 without departing from the scope of the present disclosure. Generally, in the figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a given example without departing from the scope of the present disclosure.

FIG. 1 schematically illustrates examples of manufacturing systems 10 according to the present disclosure. As schematically illustrated in FIG. 1, a manufacturing system 10 includes an additive manufacturing (AM) assembly 50 configured to at least partially form a first build component (20) via an AM process, a milling assembly 70 configured to at least partially form a second build component 22 via a milling process, and a coolant supply system 200 configured to selectively supply a coolant 210 to each of AM assembly 50 and milling assembly 70. As described in more detail herein, manufacturing system 10 generally is configured such that coolant supply system 200 selectively supplies coolant 210 to AM assembly 50 or to milling assembly 70 depending upon an operational mode of manufacturing system 10. In this manner, manufacturing system 10 also may be referred to as a dual-purpose manufacturing system 10. As used herein, first build component 20 and second build component 22 may refer to distinct components, or may refer to respective portions of a given component.

Figure 2:
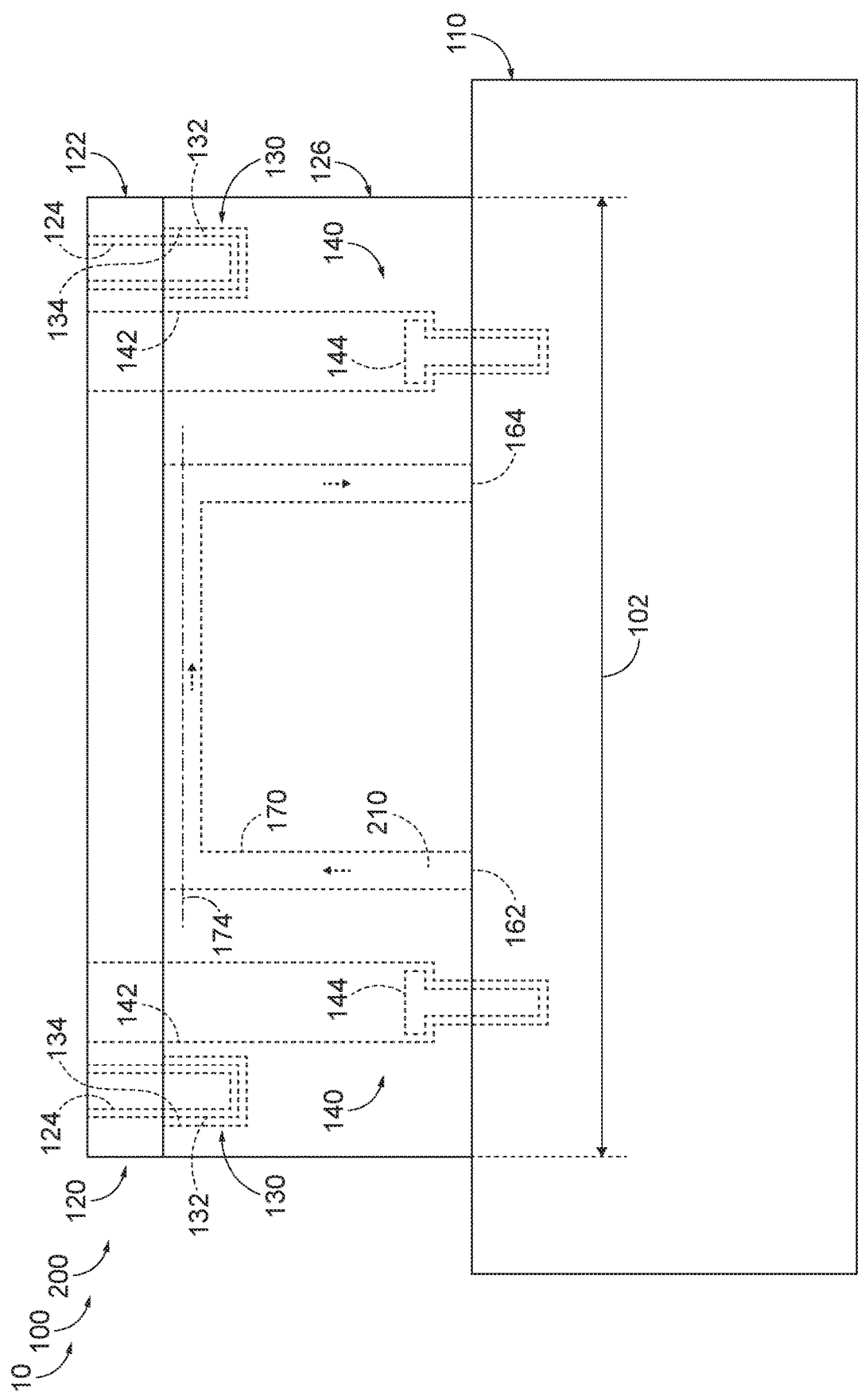
FIG. 2 is a schematic side elevation view representing examples of support assemblies according to the present disclosure.

As schematically illustrated in FIG. 1, AM assembly 50 generally includes a support assembly 100 that supports first build component 20 and that is in thermal communication with first build component 20 as first build component 20 is manufactured. As further schematically illustrated in FIG. 1, support assembly 100 also may support second build component 22. Accordingly, references and descriptions herein describing support assembly 100 supporting first build component 20 also may be understood as describing support assembly 100 supporting second build component 22. FIG. 2 schematically illustrates examples of support assembly 100 in more detail, as discussed herein. As additionally schematically illustrated in FIG. 1, coolant supply system 200 generally is configured to remove heat from support assembly 100 as first build component 20 is manufactured by flowing coolant 210 through at least a portion of support assembly 100. In this manner, coolant supply system 200 is configured to regulate a temperature of first build component 20 as first build component 20 is manufactured. That is, because support assembly 100 is in thermal communication with first build component 20, removing heat from support assembly 100 with coolant 210 serves to indirectly cool first build component 20.

As discussed, AM assembly 50 generally is configured to at least partially form first build component 20 via an AM process. As used herein, an AM process may refer to any appropriate manufacturing process, and generally refers to processes that include adding heat energy to a feedstock material to form first build component 20 from the feedstock. As examples, the AM process may include a powder feeding process, a directed energy deposition (DED) process, a direct laser deposition (DLD) process, a direct metal deposition process, a large melt pool process, and/or a powder bed process. Accordingly, and as schematically illustrated in FIG. 1, AM assembly 50 may include a material supply source 52 configured to supply a bulk material 54 to form first build component 20 and/or a directed energy source 56 configured to provide energy to bulk material 54 to at least partially form first build component 20. In such examples, bulk material 54 may include and/or be any appropriate feedstock material, such as a metal, a powdered metal, and/or a wire. Similarly, material supply source 52 may include and/or be any appropriate corresponding structure for carrying and/or supplying bulk material 54, such as a powder feeder, a wire feeder, a nozzle, and/or a powder bed. In particular, FIG. 1 schematically illustrates an example in which material supply source 52 takes the form of a nozzle that supplies bulk material 54 in the form of a stream of powder. Directed energy source 56 may include and/or be any appropriate device for adding thermal energy to bulk material 54, such as to melt and/or sinter bulk material 54 to at least partially form first build component 20. For example, and as schematically illustrated in FIG. 1, directed energy source 56 may be configured to emit a directed energy beam 58 to provide the energy to bulk material 54. As more specific examples, directed energy beam 58 may include and/or be a laser, a plasma source, and/or an electron beam.

As further schematically illustrated in FIG. 1, manufacturing system 10 additionally may include a support assembly positioning system 104 configured to selectively position support assembly 100 relative to at least a portion of AM assembly 50, such as to move first build component 20 relative to AM assembly 50 and/or to adjust a position of first build component 20 relative to AM assembly 50. As examples, support assembly positioning system 104 may be configured to translate at least a portion of support assembly 100 with one, two, or three translational degrees of freedom. Additionally or alternatively, support assembly positioning system 104 may be configured to rotate at least a portion of support assembly 100 with one, two, or three rotational degrees of freedom. As a more specific example, support assembly positioning system 104 may be configured to move and/or position support assembly 100 with six degrees of freedom.

As discussed, AM assembly 50 generally is configured to at least partially form first build component 20 by adding thermal energy to bulk material 54 such that bulk material 54 is selectively fused to first build component 20. In this manner, adding material to first build component 20 generally includes continually adding thermal energy to first build component 20, which in turn may result in a temperature of first build component 20 rising to an undesirable degree. For example, if first build component 20 reaches and/or is maintained at a sufficiently high temperature, the dimensional stability of first build component 20 may be compromised, rendering it difficult to maintain a desired geometry and/or shape of first build component 20. Additionally or alternatively, if first build component 20 reaches and/or is maintained at a sufficiently high temperature, first build component 20 may exhibit undesirable mechanical properties and/or microstructural characteristics, even when directed energy source 56 ceases to supply thermal energy to first build component 20. Accordingly, traditional AM processes may include intermittently removing directed energy beam 58 from first build component 20, such as to permit first build component 20 to cool to a desired temperature before adding more bulk material 54 (and hence more thermal energy). However, the incorporation of such cooling steps may introduce undesirable delays into the AM process. Thus, manufacturing systems 10 according to the present disclosure generally are configured to regulate the temperature of first build component 20 during the formation thereof, such as may enable first build component 20 to be formed continually without delays and with desired geometrical and structural properties.

Support assembly 100 may include and/or be any appropriate structure for supporting first build component 20 and/or at least a portion of coolant supply system 200. For example, and as schematically illustrated in FIGS. 1-2, support assembly 100 may include a baseplate 120 configured to support first build component 20 as first build component 20 is manufactured. More specifically, baseplate 120 may be configured to support first build component 20 such that first build component 20 is in thermal communication with at least a portion of support assembly 100 as first build component 20 is manufactured.

As additionally schematically illustrated in FIGS. 1-2, support assembly 100 further may include an anvil 110 that supports baseplate 120. In such examples, baseplate 120 may be directly and/or selectively coupled to anvil 110. In this manner, in such examples, anvil 110 may be configured to be utilized in conjunction with a plurality of distinct baseplates 120 and/or first build components 20, while baseplate 120 may be specifically configured and/or customized for a given first build component 20.

Baseplate 120 may be configured to support first build component 20 in any appropriate manner. For example, manufacturing system 10 may be configured to manufacture first build component 20 directly on baseplate 120. Alternatively, and as schematically illustrated in FIG. 1, support assembly 100 additionally may include a substrate blank 150 configured to be selectively and operatively coupled to baseplate 120 such that manufacturing system 10 manufactures first build component 20 directly on substrate blank 150. In such examples, the finished first build component 20 may include at least a portion of substrate blank 150. In such examples, substrate blank 150 may be operatively coupled to baseplate 120 in any appropriate manner. For example, and as schematically illustrated in FIG. 1, support assembly 100 additionally may include one or more clamps 152 configured to selectively retain substrate blank 150 against baseplate 120. In such an example, baseplate 120 may include one or more fixtures 124 configured to selectively receive and engage each clamp 152.

Baseplate 120 may be a monolithic structure, or may include two or more distinct and/or separable components. For example, and as schematically illustrated in FIGS. 1-2, baseplate 120 may include an upper baseplate member 122 and a lower baseplate member 126 that supports upper baseplate member 122. In such an embodiment, upper baseplate member 122 and lower baseplate member 126 may be configured to be selectively and repeatedly engaged with one another and removed from one another. For example, and as schematically illustrated in FIGS. 1-2, baseplate 120 may include a baseplate engagement structure 130 configured to retain upper baseplate member 122 and lower baseplate member 126 in a fixed position relative to one another when upper baseplate member 122 and lower baseplate member 126 are operatively engaged with one another. In such examples, baseplate engagement structure 130 may include and/or be any appropriate structure and/or mechanism. For example, and as schematically illustrated in FIG. 2, baseplate engagement structure 130 may include one or more engagement bosses 132 and one or more engagement holes 134 such that each engagement hole 134 receives a corresponding engagement boss 132 when upper baseplate member 122 is operatively coupled to lower baseplate member 126. As a more specific example, upper baseplate member 122 may include each engagement boss 132 and lower baseplate member 126 may include each engagement hole 134. Alternatively, upper baseplate member 122 may include each engagement hole 134 and lower baseplate member 126 may include each engagement boss 132.

As used herein, positional terms such as "upper," "lower," "above," "below," "top," "bottom," "under," "underside," and the like may be used to describe spatial relationships between components of manufacturing systems 10, of support assemblies 100, and/or of coolant supply systems 200 in an illustrative, non-limiting manner, and generally refer to a configuration in which upper baseplate member 122 is positioned above lower baseplate member 126 such that upper baseplate member 122 and lower baseplate member 126 engage one another at an interface that is substantially parallel to a ground surface. Such terms are provided as context only and do not limit component parts of manufacturing systems 10, of support assemblies 100, and/or of coolant supply systems 200 to always be in a specific orientation relative to ground.

Baseplate 120 may be operatively coupled to anvil 110 in any appropriate manner. For example, and as schematically illustrated in FIGS. 1-2, support assembly 100 additionally may include a baseplate mounting structure 140 for operatively coupling baseplate 120 to anvil 110. As a more specific example, and as schematically illustrated in FIG. 2, baseplate mounting structure 140 may include one or more baseplate mounting holes 142 defined by baseplate 120 and/or anvil 110 and one or more baseplate mounting fasteners 144 configured to extend through baseplate mounting holes 142. That is, each baseplate mounting fastener 144 may be configured to extend through a corresponding baseplate mounting hole 142 to operatively couple baseplate 120 to anvil 110. More specifically, and as schematically illustrated in FIG. 2, each baseplate mounting hole 142 may extend fully through each of upper baseplate member 122 and lower baseplate member 126 and further may extend at least partially into anvil 110. In this manner, baseplate mounting fastener 144 may be inserted into baseplate mounting hole 142 from above to couple lower baseplate member 126 to anvil 110, such as via a threaded connection. Baseplate mounting fastener 144 may include and/or be any appropriate fastener, such as a bolt.

As discussed, coolant supply system 200 generally is configured to selectively regulate a temperature of support assembly 100 and/or first build component 20 by flowing coolant 210 through at least a portion of support assembly 100. In this manner, coolant 210 absorbs thermal energy from support assembly 100 and removes the thermal energy from support assembly 100. Coolant 210 may include and/or be any appropriate fluid for conveying heat energy, such as may be known to the field of manufacturing and/or control processes. As examples, coolant 210 may include and/or be water, a machining coolant, a mineral oil, and/or glycol.

As schematically illustrated in FIGS. 1-2, coolant supply system 200 generally includes one or more coolant channels 170 configured to receive coolant 210 such that coolant 210 flows through each coolant channel 170 to remove heat from support assembly 100. Each coolant channel 170 may extend through and/or be defined by any appropriate portion of support assembly 100. As examples, each coolant channel 170 may be at least partially defined by anvil 110, baseplate 120, upper baseplate member 122, lower baseplate member 126, and/or substrate blank 150. In some embodiments, coolant channel 170 may be defined by each of two or more components of support assembly 100. As an example, and as schematically illustrated in FIG. 2, coolant channel 170 may be partially defined by each of upper baseplate member 122 and lower baseplate member 126. More specifically, in the example of FIG. 2, coolant channel 170 is substantially defined by lower baseplate member 126 and is covered by a lower side of upper baseplate member 122 such that a portion of the lower side of upper baseplate member 122 contacts coolant 210 when coolant 210 flows through coolant channel 170.

As schematically illustrated in FIGS. 1-2, each coolant channel 170 generally includes a coolant inlet 162 and a coolant outlet 164 such that coolant 210 flows through coolant channel 170 from coolant inlet 162 to coolant outlet 164. In this manner, coolant channel 170 may be described as extending between coolant inlet 162 and coolant outlet 164. As schematically illustrated in FIG. 1, coolant inlet 162 and/or coolant outlet 164 may be defined on an exterior surface and/or side of support assembly 100, such as a surface and/or side of support assembly 100 that extends substantially vertically. However, this is not required to all embodiments of coolant supply system 200, and it is additionally within the scope of the present disclosure that coolant inlet 162 and/or coolant outlet 164 may be positioned on any appropriate side and/or face of support assembly 100 and/or baseplate 120. For example, and as schematically illustrated in FIG. 2, coolant inlet 162 and/or coolant outlet 164 may be positioned on a lower surface of lower baseplate member 126, such as at a location coplanar with an interface between anvil 110 and lower baseplate member 126. In such an example, anvil 110 may engage lower baseplate member 126 across only a portion of the lower surface of lower baseplate member 126, such as to leave coolant inlet 162 and/or coolant outlet 164 exposed to be operatively coupled to one or more other components of coolant supply system 200.

With continued reference to FIG. 1, and as discussed, manufacturing system 10 includes milling assembly 70 for at least partially forming second build component 22 via a milling process. As used herein, the milling process also may be referred to as a subtractive manufacturing process. As examples, the milling process may include milling, cutting, drilling, lathing, and/or finishing. Milling assembly 70 generally includes a milling tool 72 for performing the milling process. As discussed herein, coolant supply system 200 generally is configured to selectively regulate a temperature of milling tool 72 with coolant 210. Specifically, coolant supply system 200 generally is configured to selectively flow coolant 210 over milling tool 72 to regulate the temperature of milling tool 72 during the milling process. As an example, and as schematically illustrated in FIG. 1, coolant supply system 200 may include a milling tool coolant conduit 180 configured to supply coolant 210 to milling tool 72 to cool milling tool 72 as second build component 22 is manufactured.

With continued reference to FIG. 1, manufacturing system 10 and/or coolant supply system 200 may include any appropriate components for flowing coolant 210 through coolant supply system 200 and/or through another component of manufacturing system 10, and/or for removing heat from coolant 210. For example, and as schematically illustrated in FIG. 1, coolant supply system 200 may include one or more coolant conduits 212 configured to supply coolant 210 to coolant channel(s) 170 and/or to milling tool coolant conduit 180. In this manner, milling tool coolant conduit 180 may be described as being an example of coolant conduit 212. In such examples, coolant supply system 200 additionally may include a coolant pump 224 configured to pump coolant 210 through support assembly 100 and/or through milling tool coolant conduit 180, such as via coolant conduit(s) 212 and/or coolant channel(s) 170. Additionally or alternatively, and as schematically illustrated in FIG. 1, coolant supply system 200 further may include a closed coolant loop 160, such as may be at least partially defined by coolant conduit(s) 212 and coolant channel(s) 170, such that coolant 210 flows repeatedly through closed coolant loop 160. For example, each coolant conduit 212 may extend exterior of support assembly 100 such that each coolant conduit 212 is in fluid communication with one or more coolant channels 170. In such an example, one or more coolant conduit(s) 212 may be configured to be selectively and repeatedly attached to and detached from a respective coolant inlet 162 and/or a respective coolant outlet 164. In an embodiment that includes coolant pump 224 and closed coolant loop 160, coolant pump 224 may be configured to pump coolant 210 repeatedly through closed coolant loop 160.

As further schematically illustrated in FIG. 1, coolant supply system 200 generally includes a coolant supply system controller 230 configured to generate and transmit a control signal 232 to at least partially control a flow of coolant 210 through coolant supply system 200. More specifically, coolant supply system controller 230 generally is configured to selectively direct coolant 210 to AM assembly 50 or to milling assembly 70 depending upon a manufacturing mode of manufacturing system 10. For example, manufacturing system 10 may be configured to operate in either of an AM manufacturing mode, in which AM assembly 50 operates to at least partially form first build component 20, or a milling manufacturing mode, in which milling assembly 70 operates to at least partially form second build component 22. In such examples, coolant supply system controller 230 may be configured to selectively direct coolant 210 to AM assembly 50 (such as to flow through support assembly 100) when manufacturing system 10 is in the AM manufacturing mode. Similarly, coolant supply system controller 230 may be configured to selectively direct coolant 210 to milling assembly 70 (such as to flow through milling tool coolant conduit 180 and/or to milling tool 72) when manufacturing system 10 is in the milling manufacturing mode. As a more specific example, and as schematically illustrated in FIG. 1, coolant supply system 200 may include one or more coolant valves 222 configured to selectively restrict flow of coolant 210 through at least a portion of coolant supply system 200. In an example, coolant supply system controller 230 may be configured to actuate coolant valve 222 to selectively direct coolant 210 to AM assembly 50 or to milling assembly 70 depending upon the manufacturing mode of manufacturing system 10.

Coolant supply system controller 230 may be configured to detect and/or receive the manufacturing mode of manufacturing system 10 in any appropriate manner. As an example, coolant supply system controller 230 may be configured to receive a manual input from a user corresponding to the manufacturing mode. Additionally or alternatively, and as further schematically illustrated in FIG. 1, manufacturing system 10 may include a manufacturing mode sensor 270 that is configured to automatically detect the manufacturing mode and to generate and transmit a manufacturing mode signal 272 to coolant supply system controller 230, such that manufacturing mode signal 272 is indicative of the manufacturing mode. In such examples, manufacturing mode sensor 270 may be configured to detect the manufacturing mode in any appropriate manner, such as by detecting whether material supply source 52, directed energy source 56, and/or milling tool 72 is installed and/or activated.

Coolant supply system 200 may be configured to remove heat energy from coolant 210, such as prior to and/or subsequent to coolant 210 flowing through support assembly 100, and/or prior to and/or subsequent to coolant 210 flowing over milling tool 72. For example, and as schematically illustrated in FIG. 1, coolant supply system 200 may include a heat exchanger 220 configured to remove heat from coolant 210. In such examples, coolant conduit 212 may be configured to carry coolant 210 between heat exchanger 220 and support assembly 100, such as by being pumped by coolant pump 224. Similarly, coolant conduit 212 may be configured to carry coolant 210 between heat exchanger 220 and milling tool 72, such as via milling tool coolant conduit 180, such as by being pumped by coolant pump 224.

Heat exchanger 220 may include and/or be any appropriate device and/or mechanism for removing heat energy from coolant 210, examples of which include a plate heat exchanger, a fluid heat exchanger, a shell and tube heat exchanger, a passive heat exchanger, an active heat exchanger, an electrically powered heat exchanger, and/or a refrigerator. When present, heat exchanger 220 may be configured to remove heat from coolant 210 at any appropriate location relative to support assembly 100, milling tool coolant conduit 180, and/or closed coolant loop 160. Additionally, heat exchanger 220 may be configured to bring coolant 210 to any appropriate temperature, such as a temperature near or below an ambient temperature surrounding support assembly 100. For example, heat exchanger 220 may be configured to remove heat from coolant 210 subsequent to coolant 210 flowing through support assembly 100, such as to return coolant 210 to near or below the ambient temperature prior to coolant 210 recirculating through support assembly 100 via closed coolant loop 160. Additionally or alternatively, heat exchanger 220 may be configured to remove heat from coolant 210 prior to coolant 210 flowing through support assembly 100. For example, heat exchanger 220 may be configured to chill coolant 210 to a coolant temperature that is less than the ambient temperature surrounding support assembly 100 prior to coolant 210 flowing through support assembly 100. As another example, heat exchanger 220 may be configured to remove heat from coolant 210 subsequent to coolant 210 flowing through milling tool coolant conduit 180 and/or over milling tool 72, such as to return coolant 210 to near or below an ambient temperature surrounding milling tool 72 prior to coolant 210 returning to milling assembly 70 via closed coolant loop 160. Additionally or alternatively, heat exchanger 220 may be configured to remove heat from coolant 210 prior to coolant 210 flowing through milling tool coolant conduit 180 and/or over milling tool 72. For example, heat exchanger 220 may be configured to chill coolant 210 to a coolant temperature that is less than the ambient temperature surrounding milling tool 72 prior to coolant 210 flowing over milling tool 72.

Coolant supply system 200 may be configured to regulate the flow of coolant 210 through support assembly 100 in any appropriate manner. For example, coolant supply system 200 may be configured to selectively pump coolant 210 through support assembly 100 with coolant pump 224. Additionally or alternatively, and as schematically illustrated in FIG. 1, coolant supply system 200 further may include one or more coolant valves 222 configured to selectively restrict coolant 210 from flowing through support assembly 100. Thus, for example, in an embodiment of coolant supply system 200 that includes coolant valve(s) 222 and coolant pump 224, a flow of coolant 210 through support assembly 100 may be regulated via selective actuation of coolant valve(s) 222 while maintaining coolant pump 224 in a pumping mode of operation.

As further schematically illustrated in FIG. 1, coolant supply system 200 additionally may include a coolant reservoir 226 that contains a volume of coolant 210. When present, coolant reservoir 226 may facilitate coolant supply system 200 maintaining a consistent supply of coolant 210 flowing within coolant conduit(s) 212 while permitting a volume of coolant 210 contained within coolant reservoir 226 to fluctuate. Additionally or alternatively, coolant reservoir 226 may be configured to collect coolant 210 subsequent to coolant 210 flowing through support assembly 100 and/or being utilized to cool milling tool 72. In such examples, coolant reservoir 226 also may be referred to as a coolant trough 226. In such an embodiment, coolant 210 may be configured to be reused by coolant supply system 200 subsequent to being flowed onto milling tool 72. As a more specific example, manufacturing system 10 may be configured such that coolant 210 flows into coolant reservoir 226 subsequent to being flowed onto milling tool 72 such that coolant 210 may be recirculated through closed coolant loop 160 and subsequently flowed through support assembly 100 and/or onto milling tool 72 once again.

As used herein, closed coolant loop 160 may be described as including any component of coolant supply system 200 that forms a portion of closed coolant loop 160 and/or through which coolant 210 flows while traversing closed coolant loop 160. Thus, as examples, closed coolant loop 160 may be described as including coolant channel(s) 170, milling tool coolant conduit 180, coolant inlet(s) 162, coolant outlet(s) 164, heat exchanger 220, coolant conduit(s) 212, coolant pump 224, and/or coolant reservoir 226. Closed coolant loop 160 may include and/or be any appropriate path and/or collection of paths along which coolant 210 flows. As examples, closed coolant loop 160 may be substantially and/or fully self-contained, or may be configured to permit coolant 210 to enter and/or exit closed coolant loop 160. In general, closed coolant loop 160 is configured such that coolant 210 may repeatedly traverse closed coolant loop 160 multiple times without departing from closed coolant loop 160.

Coolant supply system 200 may be configured to actively regulate a temperature of support assembly 100, of first build component 20, and/or of milling tool 72. For example, coolant supply system controller 230 may be configured to at least partially actively regulate a temperature of support assembly 100, of first build component 20, and/or of milling tool 72. Specifically, coolant supply system controller 230 may be configured to generate and transmit control signal 232 to control heat exchanger 220, coolant valve(s) 222, and/or coolant pump 224 to control a flow rate and/or temperature of coolant 210 flowing through coolant supply system 200. Coolant supply system controller 230 may be configured to operate at least substantially autonomously, and/or may be configured to generate and transmit control signal 232 at least partially responsive to a user input.

Coolant supply system controller 230 may be configured to generate control signal 232 based on any appropriate factors and/or considerations, such as may be based upon a measured temperature of a component of manufacturing system 10. For example, and as schematically illustrated in FIG. 1, coolant supply system 200 may include a build component temperature sensor 240 configured to measure a temperature of at least a portion of first build component 20 as first build component 20 is manufactured. In such an example, build component temperature sensor 240 may be configured to generate and transmit a build component temperature signal 242 that represents the temperature of first build component 20 to coolant supply system controller 230 such that coolant supply system controller 230 generates control signal 232 at least partially responsive to build component temperature signal 242. For example, coolant supply system controller 230 may be configured to generate control signal 232 to decrease a temperature of coolant 210 and/or to increase a flow rate of coolant 210 responsive to build component temperature signal 242 indicating that the temperature of at least a portion of first build component 20 is higher than a predetermined threshold temperature and/or a predetermined setpoint temperature. Build component temperature sensor 240 may include and/or be any appropriate temperature sensor, such as a non-contact temperature sensor and/or an infrared temperature sensor. In this manner, build component temperature sensor 240 may be configured to measure the temperature of first build component 20 without requiring a direct and/or physical connection to first build component 20.

Build component temperature sensor 240 may be configured to measure a temperature of any appropriate portion of first build component 20. For example, build component temperature sensor 240 may be configured to measure a characteristic, average, and/or overall temperature of first build component 20. Additionally or alternatively, build component temperature sensor 240 may be configured to measure a temperature of a localized region of first build component 20, such as a region of first build component 20 proximal directed energy beam 58 and/or a region of first build component 20 most recently formed by AM assembly 50. For example, build component temperature sensor 240 may be mounted to and/or supported by a component of AM assembly 50, such as material supply source 52 and/or directed energy source 56. In such examples, build component temperature signal 242 may correspond to a maximum temperature of first build component 20. In other examples, build component temperature sensor 240 may be independently movable relative to first build component 20 and/or AM assembly 50.

As another example, and as further schematically illustrated in FIG. 1, coolant supply system 200 additionally may include a support assembly temperature sensor 250 configured to measure a temperature of at least a portion of support assembly 100 as first build component 20 is manufactured. In such an example, support assembly temperature sensor 250 may be configured to generate and transmit a support assembly temperature signal 252 that represents the temperature of support assembly 100 to coolant supply system controller 230 such that coolant supply system controller 230 generates control signal 232 at least partially responsive to support assembly temperature signal 252. For example, coolant supply system controller 230 may be configured to generate control signal 232 to decrease a temperature of coolant 210 and/or to increase a flow rate of coolant 210 responsive to support assembly temperature signal 252 indicating that the temperature of support assembly 100 is higher than a predetermined threshold temperature and/or a predetermined setpoint temperature. Support assembly temperature sensor 250 may include and/or be any appropriate temperature sensor, such as a non-contact temperature sensor, an infrared temperature sensor, and/or a thermocouple.

As another example, and as further schematically illustrated in FIG. 1, coolant supply system 200 additionally may include a coolant temperature sensor 260 configured to measure a temperature of coolant 210. In such an example, coolant temperature sensor 260 may be configured to generate and transmit a coolant temperature signal 262 that represents the temperature of coolant 210 to coolant supply system controller 230 such that coolant supply system controller 230 generates control signal 232 at least partially responsive to coolant temperature signal 262. For example, coolant supply system controller 230 may be configured to generate control signal 232 to decrease a temperature of coolant 210 and/or to increase a flow rate of coolant 210 responsive to coolant temperature signal 262 indicating that the temperature of coolant 210 is higher than a predetermined threshold temperature and/or a predetermined setpoint temperature. Coolant temperature sensor 260 may include and/or be any appropriate temperature sensor, such as a thermocouple and/or a flow-through temperature sensor. When present, coolant temperature sensor 260 may be incorporated into and/or associated with any appropriate component of coolant supply system 200. For example, and as schematically illustrated in FIG. 1, heat exchanger 220 may include coolant temperature sensor 260. However, this is not required for all examples of coolant supply system 200, and it is additionally within the scope of the present disclosure that coolant temperature sensor 260 may be positioned at any appropriate location, such as any location within closed coolant loop 160.

As another example, and as further schematically illustrated in FIG. 1, coolant supply system 200 additionally may include a milling tool temperature sensor 280 configured to measure a temperature of milling tool 72. In such an example, milling tool temperature sensor 280 may be configured to generate and transmit a milling tool temperature signal 282 that represents the temperature of milling tool 72 to coolant supply system controller 230 such that coolant supply system controller 230 generates control signal 232 at least partially responsive to milling tool temperature signal 282. For example, coolant supply system controller 230 may be configured to generate control signal 232 to decrease a temperature of coolant 210 and/or to increase a flow rate of coolant 210 responsive to milling tool temperature signal 282 indicating that the temperature of milling tool 72 is higher than a predetermined threshold temperature and/or a predetermined setpoint temperature.

Figure 3:
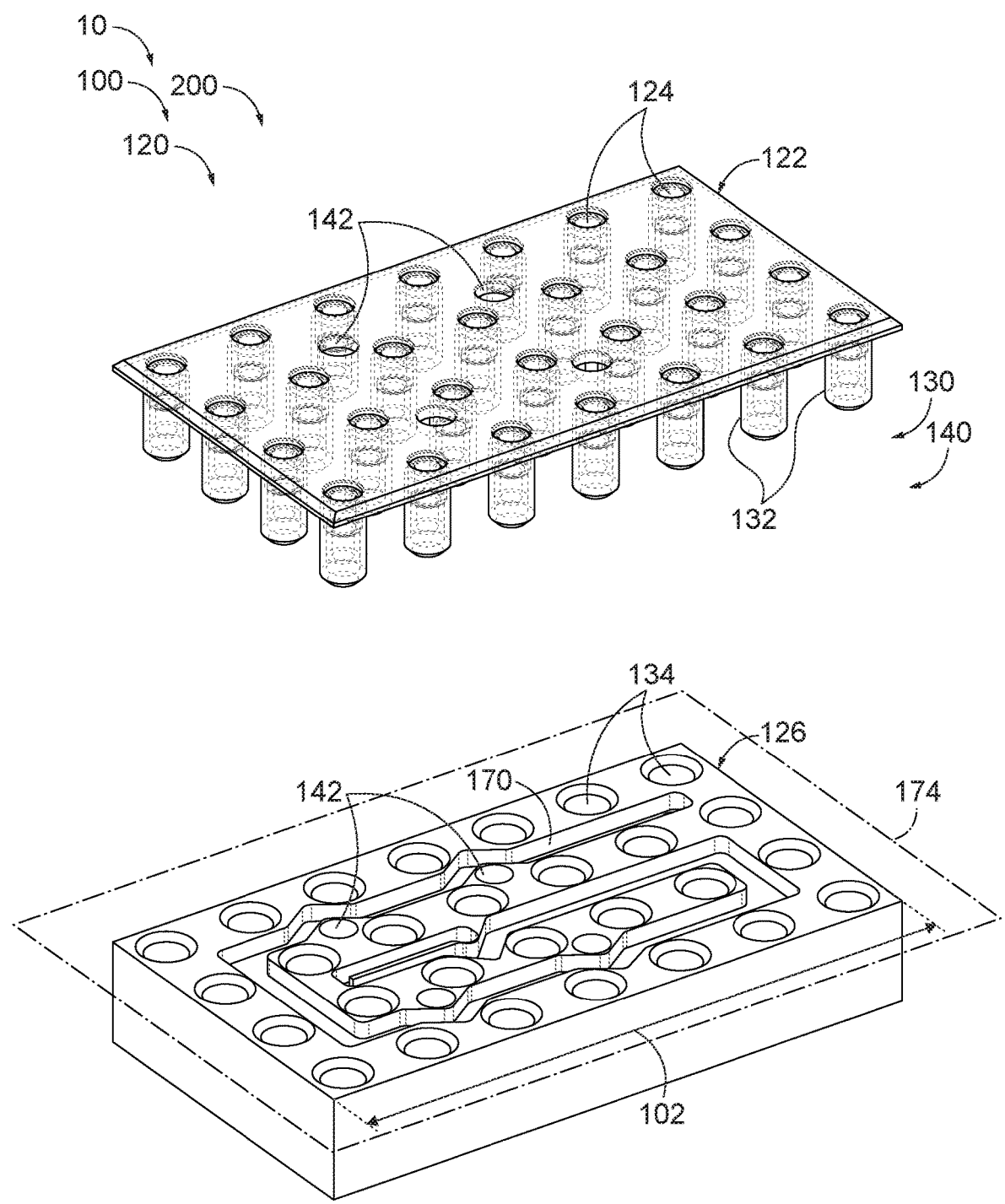
FIG. 3 is an exploded top side isometric view representing an example of a baseplate according to the present disclosure.
Figure 4:
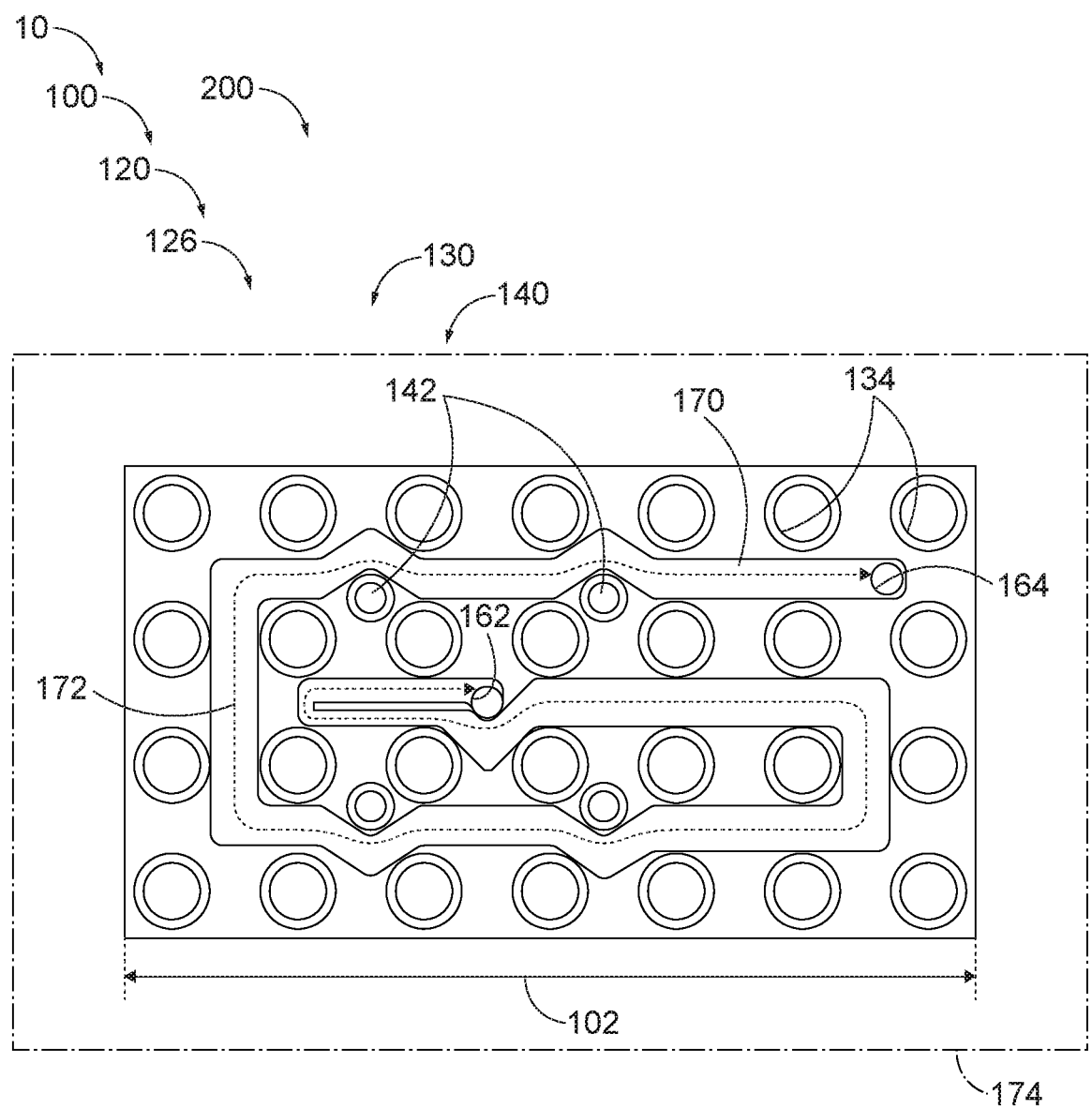
FIG. 4 is a top plan view representing a portion of the baseplate of FIG. 3.

FIGS. 3-4 are less schematic illustrations of an example of baseplate 120, such as may be utilized in manufacturing system 10 and/or support assembly 100. Specifically, FIG. 3 is an exploded view of baseplate 120 illustrating upper baseplate member 122 removed from lower baseplate member 126, while FIG. 4 is a top plan view of lower baseplate member 126. FIGS. 3-4 illustrate an example of baseplate 120 that includes baseplate engagement structure 130 in the form of a plurality of engagement bosses 132 defined by upper baseplate member 122 (shown in FIG. 3) and a corresponding plurality of engagement holes 134 defined by lower baseplate member 126. As shown in FIG. 3, each engagement boss 132 occupies a volume that includes a corresponding fixture 124. The examples of baseplate 120 of FIGS. 3-4 additionally include a plurality of baseplate mounting holes 142 extending through each of upper baseplate member 122 and lower baseplate member 126.

FIGS. 3-4 illustrate an example of baseplate 120 with coolant channel 170 being partially defined by each of upper baseplate member 122 and lower baseplate member 126. More specifically, coolant channel 170 of the example of FIGS. 3-4 is substantially defined by lower baseplate member 126 such that a lower surface of upper baseplate member 122 contains coolant 210 within coolant channel 170. FIGS. 3-4 additionally illustrate an example in which coolant inlet 162 and coolant outlet 164 are defined on a lower surface of lower baseplate member 126.

FIGS. 3-4 additionally illustrate an example in which coolant channel 170 assumes a serpentine (i.e., a non-linear) configuration. That is, and as exemplified in FIGS. 3-4, each coolant channel 170 of a coolant supply system 200 according to the present disclosure may include and/or be characterized by a channel length 172 that is equal to a shortest distance between coolant inlet 162 and coolant outlet 164 through coolant channel 170. As further shown in FIGS. 3-4, support assembly 100 additionally may include and/or be characterized by a support assembly lateral dimension 102 such that channel length 172 is greater than support assembly lateral dimension 102. As more specific examples, a ratio of channel length 172 to support assembly lateral dimension 102 may be at least 1.1:1, at least 2:1, at least 3:1, at least 4:1, at least 5:1, and/or at most 10:1. In this manner, coolant 210 may be in direct thermal contact with a greater surface area of support assembly 100 as coolant 210 flows through support assembly 100, relative to an embodiment in which coolant channel 170 extends substantially linearly across support assembly 100. Support assembly lateral dimension 102 may correspond to any appropriate dimension of support assembly 100 and/or of baseplate 120. For example, and as illustrated in FIGS. 3-4, coolant channel 170 may extend substantially within a coolant channel plane 174, and support assembly lateral dimension 102 may correspond to an exterior dimension of support assembly 100 that extends within coolant channel plane 174.

Figure 5:
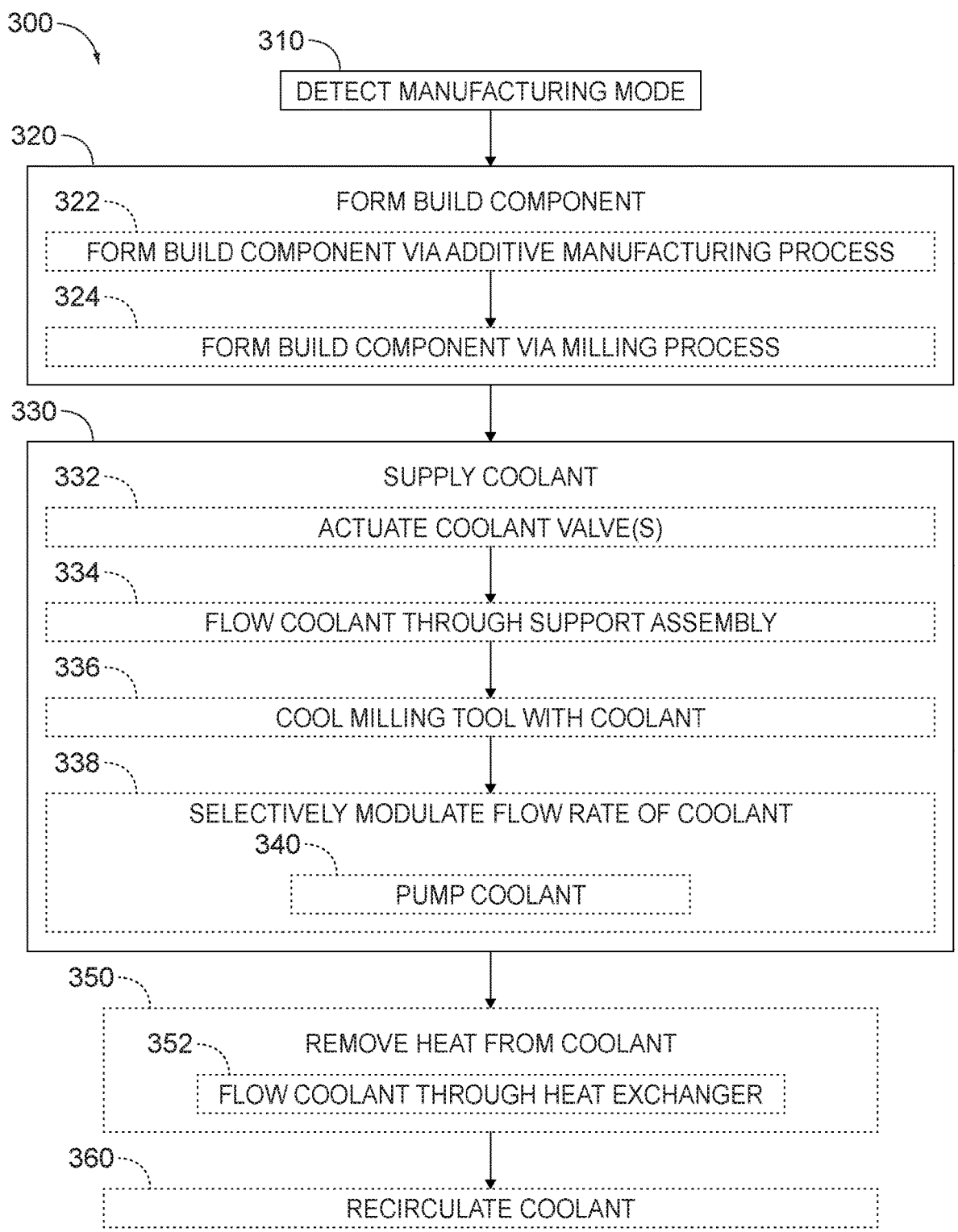
FIG. 5 is a flowchart depicting methods of operating a manufacturing system according to the present disclosure.

FIG. 5 is a flowchart depicting methods 300, according to the present disclosure, of utilizing a manufacturing system (such as manufacturing system 10) during a manufacturing process, such as to at least partially manufacture a build component (such as first build component 20 and/or second build component 22). In FIG. 5, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 5 are not limiting, and other methods and steps are within the scope of the present disclosure, including methods having greater than or fewer than the number of steps illustrated, as understood from the discussions herein.

As shown in FIG. 5, methods 300 include detecting, at 310, a manufacturing mode of the manufacturing system, and forming, at 320, the build component via the manufacturing process. Methods 300 additionally include, at least partially concurrently with the forming at 320, selectively supplying, at 330, a coolant (such as coolant 210) to a support assembly (such as support assembly 100) that supports the build component and that is in thermal communication with the build component and/or to a milling tool (such as milling tool 72) that at least partially forms the build component during a milling process. The selectively supplying at 330 is based, at least in part, on the detecting the manufacturing mode at 310, as described herein.

The forming the build component at 320 may include forming via any appropriate manufacturing process. For example, and as shown in FIG. 5, the forming at 320 may include forming, at 322, the build component via an AM process. As more specific examples, the forming the build component via the AM process at 322 may include forming the build component via a powder feeding process, a directed energy deposition (DED) process, a direct laser deposition (DLD) process, a direct metal deposition process, a large melt pool process, and/or a powder bed process. Additionally or alternatively, and as shown in FIG. 5, the forming at 320 may include forming, at 324, the build component via a milling process, such as may utilize the milling tool. As more specific examples, the milling process may include milling, cutting, lathing, drilling, and/or finishing the build component.

The detecting the manufacturing mode at 310 may include detecting whether the build component is being formed via the AM process or via the milling process such that the supplying the coolant at 330 includes supplying the coolant to a corresponding portion of the manufacturing system. For example, the detecting at 310 may include detecting that the manufacturing system is in an AM mode, such that the forming the build component at 320 includes at least partially forming the build component via the AM process. In such an example, and as shown in FIG. 5, the supplying the coolant at 330 may include flowing, at 334, the coolant through the support assembly to regulate a temperature of the build component. As another example, the detecting at 310 may include detecting that the manufacturing system is in a milling mode, such that the forming the build component at 320 includes at least partially forming the build component via the milling process. In such an example, and as shown in FIG. 5, the supplying the coolant at 330 may include cooling, at 336, the milling tool with the coolant, such as by flowing the coolant over the milling tool.

The selectively supplying the coolant at 330 may include controlling a flow of the coolant in any appropriate manner. For example, and as shown in FIG. 5, the selectively supplying at 330 may include actuating, at 332, one or more coolant valves (such as coolant valve(s) 222) to selectively direct the coolant to one or more coolant channels (such as coolant channel(s) 170) extending through the support assembly or to a milling tool coolant conduit (such as milling tool coolant conduit 180) that directs the coolant to the milling tool. In such examples, the actuating the coolant valve(s) at 332 may be performed with a coolant supply system controller (such as coolant supply system controller 230), such as responsive to a control signal (such as control signal 232) transmitted by the coolant supply system controller. For example, the detecting the manufacturing mode at 310 may include detecting the manufacturing mode with the coolant supply system controller, and the selectively supplying the coolant at 330 may include the actuating the coolant valve(s) at 332 responsive to the coolant supply system controller generating and transmitting the control signal to the coolant valve(s). In such examples, the detecting the manufacturing mode at 310 may be performed in any appropriate manner. For example, the detecting the manufacturing mode at 310 may include receiving, with the coolant supply system controller, a manual input corresponding to the manufacturing mode. Additionally or alternatively, the detecting the manufacturing mode at 310 may include generating and transmitting, with a manufacturing mode sensor (such as manufacturing mode sensor 270), a manufacturing mode signal (such as manufacturing mode signal 272) corresponding to the manufacturing mode and receiving, with the coolant supply system controller, the manufacturing mode signal.

As described herein, the manufacturing system may be a dual-purpose manufacturing machine configured to perform each of the forming the build component via an AM process at 322 and the forming the build component via a milling process at 324. In such examples, the build component that is at least partially formed during the forming via the AM process at 322 may be referred to as a first build component (such as first build component 20), and the build component that is at least partially formed during the forming via the milling process at 324 may be referred to as a second build component (such as second build component 22). More specifically, in such examples, methods 300 additionally may include, in addition to the forming the first build component via the AM process at 322, performing the detecting at 310 to detect that the manufacturing system is in the milling mode at 310, and performing the forming at 324 to at least partially form the second build component via the milling process. In such an example, the selectively supplying the coolant at 330 may include the cooling the milling tool with the coolant at 336.

In an example of method 300 that includes the forming the first build component via the AM process at 322 and the forming the second build component via the milling process at 324, the forming at 322 and the forming at 324 may be performed in any appropriate order and/or sequence. As an example, the at least partially forming the first build component via the AM process at 322 may be performed prior to, subsequent to, and/or at least partially concurrent with the at least partially forming the second build component via the milling process at 324.

In an example in which the supplying the coolant at 330 includes the flowing the coolant through the support assembly at 334, the flowing at 334 may be configured to regulate the temperature of the build component in any appropriate manner. As examples, and as described herein, the flowing at 334 may be configured to maintain the temperature of the build component below a predetermined maximum temperature and/or may be configured to maintain the temperature of the build component at least substantially at a predetermined setpoint temperature.

The flowing the coolant through the support assembly at 334 generally includes flowing the coolant through the support assembly such that the coolant removes heat from the support assembly, thereby indirectly cooling the build component. Similarly, the cooling the milling tool with the coolant at 336 generally includes flowing the coolant over the milling tool such that the coolant removes heat from the milling tool, thereby directly cooling the milling tool. Accordingly, and as shown in FIG. 5, methods 300 additionally may include removing, at 350, heat from the coolant. Additionally or alternative, and as further shown in FIG. 5, methods 300 may include, subsequent to the selectively supplying the coolant at 330, recirculating, at 360, the coolant. As an example, the supplying the coolant at 330 may include (or may be a component of) flowing the coolant through a closed coolant loop (such as closed coolant loop 160), and the recirculating at 360 may include recirculating the coolant through the closed coolant loop. In an example in which the supplying the coolant at 330 includes both the flowing the coolant through the support assembly at 334 and the cooling the milling tool with the coolant at 336, the recirculating the coolant at 360 may include the flowing the coolant through the support assembly at 334 subsequent to the cooling the milling tool with the coolant at 336. Additionally or alternatively, the recirculating the coolant at 360 may include collecting the coolant in a coolant reservoir (such as coolant reservoir 226) subsequent to the selectively supplying the coolant at 330.

The removing heat from the coolant at 350 may be performed in any appropriate manner. For example, the removing heat at 350 may be performed prior to and/or subsequent to the flowing the coolant through the support assembly at 334. As a more specific example, in an example of method 300 that includes the recirculating at 360, the removing heat at 350 may include bringing the coolant to a temperature near or below an ambient temperature surrounding the support assembly prior to the recirculating at 360. Additionally or alternatively, the removing heat at 350 may include chilling the coolant to a coolant temperature that is less than the ambient temperature surrounding the support assembly prior to the flowing the coolant through the support assembly at 334. As shown in FIG. 5, and as discussed herein, the removing heat at 350 may include flowing, at 352, the coolant through a heat exchanger (such as heat exchanger 220), such as to decrease the coolant temperature of the coolant.

The removing heat from the coolant at 350 may include regulating a temperature of the coolant based on a measured temperature of one or more components of the manufacturing system. For example, the removing heat at 350 may be based, at least in part, on a measured temperature of the build component. In such examples, the measured temperature of the build component may correspond to a build component temperature signal (such as build component temperature signal 242), such as may be generated by a build component temperature sensor (such as build component temperature sensor 240). Additionally or alternatively, the removing heat at 350 may be based, at least in part, on a measured temperature of the support assembly. In such examples, the measured temperature of the support assembly may correspond to a support assembly temperature signal (such as support assembly temperature signal 252), such as may be generated by a support assembly temperature sensor (such as support assembly temperature sensor 250). Additionally or alternatively, the removing heat at 350 may be based, at least in part, on a measured temperature of the coolant. In such examples, the measured temperature of the coolant may correspond to a coolant temperature signal (such as coolant temperature signal 262), such as may be generated by a coolant temperature sensor (such as coolant temperature sensor 260). Additionally or alternatively, the removing heat at 350 may be based, at least in part, on a measured temperature of the milling tool. In such examples, the measured temperature of the milling tool may correspond to a milling tool temperature signal (such as milling tool temperature signal 282), such as may be generated by a milling tool temperature sensor (such as milling tool temperature sensor 280). In such examples, the build component temperature signal, the support assembly temperature signal, the milling tool temperature signal, and/or the coolant temperature signal may be received by a coolant supply system controller, and the removing heat at 350 may include transmitting a control signal (such as control signal 232) from the coolant supply system controller to the heat exchanger. As a more specific example, the control signal may command the heat exchanger to lower the coolant temperature of the coolant if the build component temperature signal, the support assembly temperature signal, the milling tool temperature signal, and/or the coolant temperature signal indicates a temperature at or above a threshold temperature and/or a predetermined setpoint temperature. Similarly, the control signal may command the heat exchanger to cease lowering the coolant temperature if the build component temperature signal, the support assembly temperature signal, the milling tool temperature signal, and/or the coolant temperature signal indicates a temperature below the threshold temperature and/or the predetermined setpoint temperature. In such examples, the removing heat at 350 may include generating the control signal according to any appropriate control system routine, such as a proportional-integral-derivative (PID) algorithm.

As discussed, methods 300 may include regulating the temperature of the build component and/or the milling tool via modulation of the temperature of the coolant that flows in thermal communication with the build component and/or the milling tool. Additionally or alternatively, methods 300 may include regulating the temperature of the build component and/or of the milling tool via modulation of a flow rate of the coolant through the coolant supply system. That is, and as shown in FIG. 5, the supplying the coolant at 330 may include selectively modulating, at 338, the flow rate of the coolant, such as through the support assembly and/or over the milling tool. The selectively modulating at 338 may include modulating in any appropriate manner. As examples, and as shown in FIG. 5, the selectively modulating at 338 may include pumping, at 340, the coolant with a coolant pump (such as coolant pump 224), and/or may include the actuating the one or more coolant valves at 332 to selectively restrict and permit a flow of the coolant.

The selectively modulating the flow rate of the coolant at 338 may include regulating a flow rate of the coolant based on a measured temperature of one or more components of the manufacturing system. For example, the selectively modulating at 338 may be based, at least in part, on the measured temperature of the build component, such as may correspond to the build component temperature signal. Additionally or alternatively, the selectively modulating at 338 may be based, at least in part, on a measured temperature of the support assembly, such as may correspond to the support assembly temperature signal. Additionally or alternatively, the selectively modulating at 338 may be based, at least in part, on a measured temperature of the milling tool, such as may correspond to the milling tool temperature signal. Additionally or alternatively, the selectively modulating at 338 may be based, at least in part, on a measured temperature of the coolant, such as may correspond to the coolant temperature signal. In such examples, the selectively modulating at 338 may include transmitting the control signal from the coolant supply system controller to the coolant pump and/or to the coolant valve(s). As a more specific example, the control signal may command the coolant pump to pump the coolant, and/or to command the coolant valve(s) to permit the coolant to flow through the support assembly and/or to the milling tool, if the build component temperature signal, the support assembly temperature signal, the milling tool temperature signal, and/or the coolant temperature signal indicates a temperature at or above a threshold temperature and/or a predetermined setpoint temperature. Similarly, the control signal may command the coolant pump to cease pumping the coolant, and/or may command the coolant valve(s) to restrict flow of the coolant through the support assembly and/or to the milling tool, if the build component temperature signal, the support assembly temperature signal, the milling tool temperature signal, and/or the coolant temperature signal indicates a temperature below the threshold temperature and/or the predetermined setpoint temperature. In such examples, the selectively modulating at 338 may include generating the control signal according to any appropriate control system routine, such as a proportional-integral-derivative (PID) algorithm.

Illustrative, non-exclusive examples of inventive subject matter according to the present disclosure are described in the following enumerated paragraphs:

A1. A manufacturing system (10), the manufacturing system (10) comprising:

an additive manufacturing (AM) assembly (50) configured to at least partially form a first build component (20) via an AM process;

a milling assembly (70) configured to at least partially form a second build component (22) via a milling process; and a coolant supply system (200) configured to selectively supply a coolant (210) to each of the AM assembly (50) and the milling assembly (70).

A2. The manufacturing system (10) of paragraph A1, wherein the AM assembly (50) includes a support assembly (100) that supports the first build component (20) and that is in thermal communication with the first build component (20) as the first build component (20) is manufactured, and wherein the a coolant supply system (200) is configured to remove heat from the support assembly (100) as the first build component (20) is manufactured by flowing the coolant (210) through at least a portion of the support assembly (100) to regulate a temperature of the first build component (20) as the first build component (20) is manufactured.

A3. The manufacturing system (10) of any of paragraphs A1-A2, wherein the milling assembly (70) includes a milling tool (72) that is configured to at least partially form the second build component (22), and wherein the coolant supply system (200) includes a milling tool coolant conduit (180) configured to supply the coolant (210) to the milling tool (72) to cool the milling tool (72) as the second build component (22) is manufactured.

A4. The manufacturing system (10) of any of paragraphs A1-A3, wherein the coolant supply system (200) further includes a coolant supply system controller (230) configured to generate and transmit a control signal 232 to at least partially control a flow of the coolant (210) through the coolant supply system (200).

A5. The manufacturing system (10) of paragraph A4, wherein the manufacturing system (10) is configured to operate in a manufacturing mode that is one of an AM manufacturing mode, in which the AM assembly (50) operates to at least partially form the first build component (20), and a milling manufacturing mode, in which the milling assembly (70) operates to at least partially form the second build component (22), and wherein the coolant supply system controller (230) is configured to selectively direct the coolant (210) to one of the AM assembly (50) and the milling assembly (70) based, at least in part, on the manufacturing mode of the manufacturing system (10).

A6. The manufacturing system (10) of paragraph A5, wherein the coolant supply system (200) further includes one or more coolant valves (222) configured to selectively restrict flow of the coolant (210) through at least a portion of the coolant supply system (200), and wherein the coolant supply system controller (230) is configured to actuate at least one of the one or more coolant valves (222) to selectively direct the coolant (210).

A7. The manufacturing system (10) of any of paragraphs A5-A6, wherein the coolant supply system controller (230) is configured to receive a manual input from a user corresponding to the manufacturing mode of the manufacturing system (10).

A8. The manufacturing system (10) of any of paragraphs A5-A7, further comprising a manufacturing mode sensor (270) that is configured to automatically detect the manufacturing mode of the manufacturing system (10) and to generate and transmit a manufacturing mode signal (272) that is indicative of the manufacturing mode to the coolant supply system controller (230).

A9. The manufacturing system (10) of any of paragraphs A6-A8, when dependent from paragraph A2, wherein the coolant supply system controller (230) is configured such that, when the manufacturing system is in the AM manufacturing mode, the coolant supply system controller (230) actuates the at least one of the one or more coolant valves (222) to direct the coolant (210) to the support assembly (100) to regulate a temperature of the first build component (20).

A10. The manufacturing system (10) of any of paragraphs A6-A9, when dependent from paragraph A3, wherein the coolant supply system controller (230) is configured such that, when the manufacturing system is in the milling manufacturing mode, the coolant supply system controller (230) actuates the at least one of the one or more coolant valves (222) to direct the coolant (210) to the milling tool coolant conduit (180) to regulate a temperature of the milling tool (72).

A11. The manufacturing system (10) of any of paragraphs A1-A10, wherein the AM process includes one or more of a powder feeding process, a directed energy deposition (DED) process, a direct laser deposition (DLD) process, a direct metal deposition process, a large melt pool process, and a powder bed process.

A12. The manufacturing system (10) of any of paragraphs A1-A11, wherein the AM assembly (50) includes a material supply source (52) configured to supply a bulk material (54) to form the first build component (20).

A13. The manufacturing system (10) of paragraph A12, wherein the bulk material (54) includes one or more of a metal, a powdered metal, and a wire.

A14. The manufacturing system (10) of any of paragraphs A12-A13, wherein the material supply source (52) includes one or more of a powder feeder, a wire feeder, a nozzle, and a powder bed.

A15. The manufacturing system (10) of any of paragraphs A12-A14, wherein the AM assembly (50) includes a directed energy source (56) configured to provide energy to the bulk material (54) to at least partially form the first build component (20).

A16. The manufacturing system (10) of paragraph A15, wherein the directed energy source (56) is configured to one or more of melt the bulk material (54) and sinter the bulk material (54) to at least partially form the first build component (20).

A17. The manufacturing system (10) of any of paragraphs A15-A16, wherein the directed energy source (56) is configured to emit a directed energy beam (58) that includes one or more of a laser, a plasma source, and an electron beam.

A18. The manufacturing system (10) of any of paragraphs A2-A17, wherein the support assembly (100) includes a baseplate (120) and an anvil (110) that supports the baseplate (120), wherein the baseplate (120) is configured to support the first build component (20) as the first build component (20) is manufactured.

A19. The manufacturing system (10) of paragraph A18, wherein the baseplate (120) is configured to support the first build component (20) such that the first build component (20) is in thermal communication with at least a portion of the support assembly (100) as the first build component (20) is manufactured.

A20. The manufacturing system (10) of any of paragraphs A18-A19, wherein the baseplate (120) is directly coupled to the anvil (110).

A21. The manufacturing system (10) of any of paragraphs A18-A20, wherein the manufacturing system (10) is configured to manufacture the first build component (20) directly on the baseplate (120).

A22. The manufacturing system (10) of any of paragraphs A18-A20, wherein the support assembly (100) further includes a substrate blank (150) that configured to be selectively and operatively coupled to the baseplate (120), and wherein the manufacturing system (10) is configured to manufacture the first build component (20) directly on the substrate blank (150).

A23. The manufacturing system (10) of paragraph A22, wherein the support assembly (100) further includes one or more clamps (152) configured to selectively retain the substrate blank (150) against the baseplate (120), and wherein the baseplate (120) includes one or more fixtures (124) configured to selectively receive and engage the one or more clamps (152).

A24. The manufacturing system (10) of any of paragraphs A18-A23, wherein the baseplate (120) includes an upper baseplate member (122) and a lower baseplate member (126) that supports the upper baseplate (120).

A25. The manufacturing system (10) of paragraph A24, wherein the upper baseplate member (122) and the lower baseplate member (126) are configured to be selectively and repeatedly engaged with one another and removed from one another.

A26. The manufacturing system (10) of any of paragraphs A24-A25, wherein the baseplate (120) further includes a baseplate engagement structure (130) configured to retain the upper baseplate member (122) and the lower baseplate member (126) in a fixed position relative to one another when the upper baseplate member (122) and the lower baseplate member (126) are operatively engaged with one another.

A27. The manufacturing system (10) of paragraph A26, wherein the baseplate engagement structure (130) includes one or more engagement bosses (132) and one or more engagement holes (134) that receive a corresponding engagement boss (132) of the one or more engagement bosses (132) when the upper baseplate member (122) is operatively coupled to the lower baseplate member (126), wherein one of the upper baseplate member (122) and the lower baseplate member (126) includes the one or more engagement bosses (132), and wherein the other of the upper baseplate member (122) and the lower baseplate member (126) includes the one or more engagement holes (134).

A28. The manufacturing system (10) of any of paragraphs A24-A27, when dependent from paragraph A23, wherein the upper baseplate member (122) includes each fixture of the one or more fixtures (124).

A29. The manufacturing system (10) of any of paragraphs A18-A28, wherein the support assembly (100) further includes a baseplate mounting structure (140) for operatively coupling the baseplate (120) to the anvil (110).

A30. The manufacturing system (10) of paragraph A29, wherein the baseplate mounting structure (140) includes:

(i) one or more baseplate mounting holes (142) defined by one or more of the baseplate (120) and the anvil (110); and (ii) one or more baseplate mounting fasteners (144), each baseplate mounting fastener (144) configured to extend through a corresponding baseplate mounting hole (142) to operatively couple the baseplate (120) to the anvil (110).

A31. The manufacturing system (10) of any of paragraphs A2-A30, when dependent from paragraph A15, further comprising a support assembly positioning system (104) configured to selectively position the support assembly (100) relative to at least a portion of the AM assembly (50).

A32. The manufacturing system (10) of paragraph A31, wherein the support assembly positioning system (104) is configured to translate at least a portion of the support assembly (100) with one or more of one translational degree of freedom, two translational degrees of freedom, and three translational degrees of freedom.

A33. The manufacturing system (10) of any of paragraphs A31-A32, wherein the support assembly positioning system (104) is configured to rotate at least a portion of the support assembly (100) with one or more of one rotational degree of freedom, two rotational degrees of freedom, and three rotational degrees of freedom.

A34. The manufacturing system (10) of any of paragraphs A1-A33, wherein the milling process includes one or more of milling, cutting, lathing, drilling, and finishing.

A35. The manufacturing system (10) of any of paragraphs A1-A34, wherein the coolant (210) includes one or more of water, a machining coolant, a mineral oil, and glycol.

A36. The manufacturing system (10) of any of paragraphs A2-A35, wherein the support assembly (100) includes one or more coolant channels (170) configured to receive the coolant (210), and wherein the coolant (210) is configured to flow through the one or more coolant channels (170) to remove heat from the support assembly (100).

A37. The manufacturing system (10) of paragraph A36, wherein each coolant channel (170) is at least partially defined by one or more of the anvil (110), the baseplate (120), the upper baseplate member (122), the lower baseplate member (126), and the substrate blank (150).

A38. The manufacturing system (10) of paragraph A37, wherein at least one coolant channel (170) is at least partially defined by each of two or more of the anvil (110), the baseplate (120), the upper baseplate member (122), the lower baseplate member (126), and the substrate blank (150).

A39. The manufacturing system (10) of paragraph A38, wherein at least one coolant channel (170) is partially defined by each of the upper baseplate member (122) and the lower baseplate member (126).

A40. The manufacturing system (10) of any of paragraphs A36-A39, wherein each coolant channel (170) includes a coolant inlet (162) and a coolant outlet (164), wherein the coolant (210) is configured to flow through the coolant channel (170) from the coolant inlet (162) to the coolant outlet (164).

A41. The manufacturing system (10) of paragraph A40, wherein each coolant channel (170) extends between the coolant inlet (162) and the coolant outlet (164).

A42. The manufacturing system (10) of any of paragraphs A36-A41, wherein each coolant channel (170) has a channel length (172) that is equal to a shortest distance between the corresponding coolant inlet (162) and the corresponding coolant outlet (164) through the coolant channel (170), wherein the support assembly (100) has a support assembly lateral dimension (102), and wherein the channel length (172) is greater than the support assembly lateral dimension (102).

A43. The manufacturing system (10) of paragraph A42, wherein a ratio of the channel length (172) to the support assembly lateral dimension (102) is one or more of at least 1.1:1, at least 2:1, at least 3:1, at least 4:1, at least 5:1, and at most 10:1.

A44. The manufacturing system (10) of any of paragraphs A42-A43, wherein the coolant channel (170) extends substantially within a coolant channel plane (174), and wherein the support assembly lateral dimension (102) corresponds to an exterior dimension of the support assembly (100) that extends within the coolant channel plane (174).

A45. The manufacturing system (10) of any of paragraphs A1-A44, wherein the coolant supply system (200) further includes a heat exchanger (220) configured to remove heat from the coolant (210).

A46. The manufacturing system (10) of paragraph A45, wherein the heat exchanger (220) includes one or more of a plate heat exchanger, a fluid heat exchanger, a shell and tube heat exchanger, a passive heat exchanger, an active heat exchanger, an electrically powered heat exchanger, and a refrigerator.

A47. The manufacturing system (10) of any of paragraphs A45-A46, when dependent from paragraph A2, wherein the heat exchanger (220) is configured to remove heat from the coolant (210) subsequent to the coolant (210) flowing through the support assembly (100).

A48. The manufacturing system (10) of any of paragraphs A45-A47, when dependent from paragraph A2, wherein the heat exchanger (220) is configured to remove heat from the coolant (210) prior to the coolant (210) flowing through the support assembly (100).

A49. The manufacturing system (10) of paragraph A48, wherein the heat exchanger (220) is configured to chill the coolant (210) to a coolant temperature that is less than an ambient temperature surrounding the support assembly (100) prior to the coolant (210) flowing through the support assembly (100).

A50. The manufacturing system (10) of any of paragraphs A45-A49, when dependent from paragraph A3, wherein the heat exchanger (220) is configured to remove heat from the coolant (210) subsequent to the coolant (210) flowing through the milling tool coolant conduit (180).

A51. The manufacturing system (10) of any of paragraphs A45-A50, when dependent from paragraph A3, wherein the heat exchanger (220) is configured to remove heat from the coolant (210) prior to the coolant (210) flowing through the milling tool coolant conduit (180).

A52. The manufacturing system (10) of paragraph A51, wherein the heat exchanger (220) is configured to chill the coolant (210) to a/the coolant temperature that is less than an/the ambient temperature surrounding the milling tool (72) prior to the coolant (210) flowing through the milling tool coolant conduit (180).

A53. The manufacturing system (10) of any of paragraphs A36-A52, wherein the coolant supply system (200) further includes one or more coolant conduits (212) configured to supply the coolant (210) to each coolant channel (170).

A54. The manufacturing system (10) of paragraph A53, wherein at least one coolant conduit (212) is configured to carry the coolant (210) between the heat exchanger (220) and the support assembly (100).

A55. The manufacturing system (10) of any of paragraphs A53-A54, wherein each coolant conduit (212) extends exterior of the support assembly (100).

A56. The manufacturing system (10) of any of paragraphs A53-A55, wherein at least one of the one or more coolant conduits (212) is configured to be selectively and repeatedly attached to and detached from one or more of a respective coolant inlet (162) and a respective coolant outlet (164).

A57. The manufacturing system (10) of any of paragraphs A1-A56, wherein the coolant supply system (200) further includes a coolant pump (224) configured to pump the coolant (210) through the coolant supply system (200).

A58. The manufacturing system (10) of paragraph A57, wherein the coolant pump (224) is configured to pump the coolant (210) between a/the heat exchanger (220) and a/the support assembly (100).

A59. The manufacturing system (10) of any of paragraphs A1-A58, wherein the coolant supply system (200) further includes a coolant reservoir (226) that contains a volume of the coolant (210).

A60. The manufacturing system (10) of paragraph A59, when dependent from paragraph A50, wherein the coolant reservoir (226) is configured to facilitate maintaining a consistent supply of the coolant (210) within the one or more coolant conduits (212) while permitting a volume of the coolant (210) contained within the coolant reservoir (226) to fluctuate.

A61. The manufacturing system (10) of any of paragraphs A59-A60, wherein the coolant reservoir (226) is configured to collect the coolant (210) subsequent to the coolant (210) flowing through a/the support assembly (100) or subsequent to the coolant (210) cooling the milling tool (72).

A62. The manufacturing system (10) of any of paragraphs A1-A61, wherein the coolant supply system (200) further includes a closed coolant loop (160), wherein the coolant (210) is configured to flow repeatedly through the closed coolant loop (160).

A63. The manufacturing system (10) of paragraph A62, wherein a/the coolant pump (224) is configured to pump the coolant (210) repeatedly through the closed coolant loop (160).

A64. The manufacturing system (10) of any of paragraphs A62-A63, wherein the closed coolant loop (160) includes one or more of:
  (i) a/the one or more coolant channels (170);
  (ii) a/the one or more coolant inlets (162);
  (iii) a/the one or more coolant outlets (164);
  (iv) a/the heat exchanger (220);
  (v) a/the one or more coolant conduits (212);
  (vi) a/the one or more coolant valves (222);
  (vii) a/the coolant pump (224);
  (viii) a/the coolant reservoir (226); and
  (ix) a/the milling tool coolant conduit (180).

A65. The manufacturing system (10) of any of paragraphs A4-A64, wherein the coolant supply system controller (230) is configured to generate and transmit the control signal (232) to automatically control one or more of a/the heat exchanger (220), a/the coolant valve(s) (222), and a/the coolant pump (224) to at least partially regulate the temperature of one or more of the support assembly (100), the first build component (20), and the milling tool (72).

A66. The manufacturing system (10) of paragraph A65, wherein the coolant supply system (200) further includes a build component temperature sensor (240) configured to measure a temperature of at least a portion of the first build component (20) as the first build component (20) is manufactured, wherein the build component temperature sensor (240) is configured to generate and transmit a build component temperature signal (242) that represents the temperature of the first build component (20) to the coolant supply system controller (230), and wherein the coolant supply system controller (230) is configured to generate the control signal (232) at least partially responsive to the build component temperature signal (242).

A67. The manufacturing system (10) of paragraph A64, wherein the build component temperature sensor (240) includes one or more of a non-contact temperature sensor and an infrared temperature sensor.

A68. The manufacturing system (10) of any of paragraphs A66-A67, wherein the build component temperature sensor (240) is configured to measure a temperature of a region of the first build component (20) most recently formed by a/the AM assembly (50).

A69. The manufacturing system (10) of any of paragraphs A66-A68, wherein the build component temperature sensor (240) is configured to measure a maximum temperature of the first build component (20).

A70. The manufacturing system (10) of any of paragraphs A66-A69, wherein the build component temperature sensor (240) is mounted to at least a portion of the AM assembly (50).

A71. The manufacturing system (10) of any of paragraphs A66-A70, wherein the build component temperature sensor (240) is independently movable relative to one or more of the first build component (20) and a/the AM assembly (50).

A72. The manufacturing system (10) of any of paragraphs A65-A71, wherein the coolant supply system (200) further includes a support assembly temperature sensor (250) configured to measure a temperature of at least a portion of the support assembly (100) as the first build component (20) is manufactured, wherein the support assembly temperature sensor (250) is configured to generate and transmit a support assembly temperature signal (252) that represents the temperature of the support assembly (100) to the coolant supply system controller (230), and wherein the coolant supply system controller (230) is configured to generate the control signal (232) at least partially responsive to the support assembly temperature signal (252).

A73. The manufacturing system (10) of paragraph A72, wherein the support assembly temperature sensor (250) includes one or more of a non-contact temperature sensor, an infrared temperature sensor, and a thermocouple.

A74. The manufacturing system (10) of any of paragraphs A65-A73, wherein the coolant supply system (200) further includes a coolant temperature sensor (260) configured to measure a temperature of the coolant (210), wherein the coolant temperature sensor (260) is configured to generate and transmit a coolant temperature signal (262) that represents the temperature of the coolant (210) to the coolant supply system controller (230), and wherein the coolant supply system controller (230) is configured to generate the control signal (232) at least partially responsive to the coolant temperature signal (262).

A75. The manufacturing system (10) of paragraph A74, wherein the coolant temperature sensor (260) includes one or more of a thermocouple and a flow-through temperature sensor.

A76. The manufacturing system (10) of any of paragraphs A65-A75, wherein the coolant supply system (200) further includes a milling tool temperature sensor (280) configured to measure a temperature of at least a portion of the milling tool (72), wherein the milling tool temperature sensor (280) is configured to generate and transmit a milling tool temperature signal (282) that represents the temperature of the milling tool (72) to the coolant supply system controller (230), and wherein the coolant supply system controller (230) is configured to generate the control signal (232) at least partially responsive to the milling tool temperature signal (282).

A77. The manufacturing system (10) of any of paragraphs A1-A76, wherein the first build component (20) and the second build component (22) are distinct components.

A78. The manufacturing system (10) of any of paragraphs A1-A76, wherein the first build component (20) and the second build component (22) correspond to respective portions of a single component.

B1. A method (300) of operating a manufacturing system (10) during a manufacturing process, the method (300) comprising:

detecting (310) a manufacturing mode of the manufacturing system (10);

forming (320) a build component (20) via the manufacturing process; and at least partially concurrent with the forming (320) the build component (20), selectively supplying (330) a coolant (210) to one or more of:

(i) a support assembly (100) that supports the build component (20) and that is in thermal communication with the build component (20); and (ii) a milling tool (72) that at least partially forms the build component (20) during a milling process;

wherein the selectively supplying (330) the coolant (210) is based, at least in part, on the detecting (310) the manufacturing mode.

B2. The method (300) of paragraph B1, wherein the detecting (310) the manufacturing mode includes detecting (310) that the manufacturing system (10) is in an AM mode, wherein the forming (320) the build component (20) includes at least partially forming (322) the build component (20) via an AM process, and wherein the selectively supplying (330) the coolant (210) includes flowing (334) the coolant (210) through the support assembly (100) to regulate a temperature of the build component (20).

B3. The method (300) of paragraph B2, wherein the AM process includes one or more of a powder feeding process, a directed energy deposition (DED) process, a direct laser deposition (DLD) process, a direct metal deposition process, a large melt pool process, and a powder bed process.

B4. The method (300) of any of paragraphs B2-B3, wherein the flowing (334) the coolant (210) through the support assembly (100) is configured to maintain the temperature of the build component (20) below a predetermined maximum temperature.

B5. The method (300) of any of paragraphs B2-B4, wherein the flowing (334) the coolant (210) through the support assembly (100) is configured to maintain the temperature of the build component (20) at least substantially at a predetermined setpoint temperature.

B6. The method (300) of any of paragraphs B2-B5, wherein the flowing (334) the coolant (210) through the support assembly (100) includes flowing the coolant (210) through a closed coolant loop (160).

B7. The method (300) of paragraph B1, wherein the detecting (310) the manufacturing mode includes detecting that the manufacturing system (10) is in a milling mode, wherein the forming (320) the build component (20) includes at least partially forming (324) the build component (20) with the milling process, and wherein the selectively supplying (330) the coolant (210) includes cooling (336) the milling tool (72) with the coolant (210).

B8. The method (300) of paragraph B2, wherein the build component (20) is a first build component (20), wherein the method (300) further includes detecting (310) that the manufacturing system (10) is in a milling mode, wherein the forming (320) includes at least partially forming (324) a second build component (22) via the milling process, and wherein the selectively supplying (330) the coolant (210) includes cooling (336) the milling tool (72) with the coolant (210).

B9. The method (300) of paragraph B8, wherein the at least partially forming (322) the first build component (20) with the AM process is performed prior to the at least partially forming (324) the second build component (22) with the milling process.

B10. The method (300) of paragraph B8, wherein the at least partially forming (322) the first build component (20) with the AM process is performed subsequent to the at least partially forming (324) the second build component (22) with the milling process.

B11. The method (300) of paragraph B8, wherein the at least partially forming (322) the first build component (20) with the AM process is performed at least partially concurrently with the at least partially forming (324) the second build component (22) with the milling process.

B12. The method (300) of any of paragraphs B7-B11, wherein the cooling (336) the milling tool (72) with the coolant (210) includes flowing the coolant (210) over the milling tool (72).

B13. The method (300) of any of paragraphs B1-B12, wherein the detecting (310) the manufacturing mode includes detecting (310) the manufacturing mode with a coolant supply system controller (230).

B14. The method (300) of paragraph B13, wherein the detecting (310) the manufacturing mode includes receiving, with the coolant supply system controller (230), a manual input corresponding to the manufacturing mode.

B15. The method (300) of any of paragraphs B13-B14, wherein the detecting (310) the manufacturing mode includes generating and transmitting, with a manufacturing mode sensor (270), a manufacturing mode signal (272) corresponding to the manufacturing mode and receiving, with the coolant supply system controller (230), the manufacturing mode signal (272).

B16. The method (300) of any of paragraphs B1-B15, wherein the supplying (330) the coolant (210) includes actuating (332) one or more coolant valves (222) to selectively direct the coolant (210) to one or more coolant channels (170) extending through the support assembly (100) or to a milling tool coolant conduit (180) that directs the coolant (210) to the milling tool (72).

B17. The method (300) of any of paragraphs B1-B16, further comprising:
  removing (350) heat from the coolant (210).

B18. The method (300) of paragraph B17, wherein the removing (350) heat from the coolant (210) includes flowing (352) the coolant (210) through a heat exchanger (220).

B19. The method (300) of paragraph B18, when dependent from any of paragraphs B2-B6, wherein the flowing (352) the coolant (210) through the heat exchanger (220) is performed subsequent to the flowing (334) the coolant (210) through the support assembly (100).

B20. The method (300) of any of paragraphs B18-B19, when dependent from any of paragraphs B2-B6, wherein the flowing (352) the coolant (210) through the heat exchanger (220) is performed prior to the flowing (334) the coolant (210) through the support assembly (100).

B21. The method (300) of any of paragraphs B17-B20, wherein the removing (350) heat from the coolant (210) includes bringing the coolant (210) to a coolant temperature that is near or below an ambient temperature surrounding the support assembly (100).

B22. The method (300) of any of paragraphs B17-B21, when dependent from any of paragraphs B2-B6, wherein the removing (350) heat from the coolant (210) includes chilling the coolant (210) to a/the coolant temperature that is less than an/the ambient temperature surrounding the support assembly (100) prior to the flowing (334) the coolant (210) through the support assembly (100).

B23. The method (300) of any of paragraphs B17-B22, wherein the removing (350) heat from the coolant (210) is based, at least in part, on one or more of a measured temperature of the build component (20), a measured temperature of the support assembly (100), and a measured temperature of the coolant (210).

B24. The method (300) of paragraph B23, wherein the removing (350) heat from the coolant (210) includes generating a control signal (232) based, at least in part, on one or more of a build component temperature signal (242), a support assembly temperature signal (252), a coolant temperature signal (262), and a milling tool temperature signal (282).

B25. The method (300) of any of paragraphs B17-B24, wherein the removing (350) heat from the coolant (210) includes generating a/the control signal (232) according to a proportional-integral-derivative (PID) algorithm.

B26. The method (300) of any of paragraphs B1-B25, further comprising, subsequent to the selectively supplying (330) the coolant (210), recirculating (360) the coolant (210).

B27. The method (300) of paragraph B26, when dependent from any of paragraphs B2-B6 and from any of paragraphs B7-B12, wherein the recirculating (360) the coolant (210) includes flowing (334) the coolant (210) through the support assembly (100) subsequent to cooling (336) the milling tool (72) with the coolant (210).

B28. The method (300) of any of paragraphs B26-B27, when dependent from any of paragraphs B2-B6 and from any of paragraphs B7-B12, wherein the recirculating (360) the coolant (210) includes cooling (336) the milling tool (72) with the coolant (210) subsequent to flowing (334) the coolant (210) through the support assembly (100).

B29. The method (300) of any of paragraphs B26-B28, wherein the recirculating (360) the coolant (210) includes collecting the coolant (210) in a coolant reservoir (226) subsequent to the selectively supplying (330) the coolant (210).

B30. The method (300) of any of paragraphs B1-B29, wherein the selectively supplying (330) the coolant (210) includes selectively modulating (338) a flow rate of the coolant (210).

B31. The method (300) of paragraph B30, wherein the selectively modulating (338) the flow rate includes selectively pumping (340) the coolant (210) with a coolant pump (224).

B32. The method (300) of any of paragraphs B30-B31, wherein the selectively modulating (338) the flow rate includes a/the actuating (332) a/the one or more coolant valves (222) to selectively control a flow of the coolant (210).

B33. The method (300) of any of paragraphs B30-B32, wherein the selectively modulating (338) the flow rate is based, at least in part, on one or more of a/the measured temperature of the build component (20), a/the measured temperature of the support assembly (100), and a/the measured temperature of the coolant (210).

B34. The method (300) of paragraph B33, wherein the selectively modulating (338) the flow rate includes generating a/the control signal (232) based, at least in part, on one or more of a/the build component temperature signal (242), a/the support assembly temperature signal (252), a/the coolant temperature signal (262), and a/the milling tool temperature signal (282).

B35. The method (300) of any of paragraphs B30-B34, wherein the selectively modulating (338) the flow rate includes generating a/the control signal (232) according to a proportional-integral-derivative (PID) algorithm.

B36. The method (300) of any of paragraphs B1-B35, utilizing the manufacturing system (10) of any of paragraphs A1-A78.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Entities other than the entities specifically identified by the "and/or" clause may be present, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

The invention claimed is:

1. A manufacturing system, the manufacturing system comprising:
an additive manufacturing (AM) assembly configured to at least partially form a first build component via an AM process;
a milling assembly configured to at least partially form a second build component via a milling process; and
a coolant supply system configured to selectively supply a coolant to each of the AM assembly and the milling assembly;
wherein the AM assembly includes a support assembly that supports the first build component and that is in thermal communication with the first build component as the first build component is manufactured, wherein the coolant supply system is configured to remove heat from the support assembly as the first build component is manufactured by flowing the coolant through at least a portion of the support assembly to regulate a temperature of the first build component as the first build component is manufactured,
wherein the coolant supply system includes a coolant supply system controller configured to generate and transmit a control signal to at least partially control a flow of the coolant through the coolant supply system, wherein the manufacturing system is configured to operate in a manufacturing mode that is one of an AM manufacturing mode, in which the AM assembly operates to at least partially form the first build component, and a milling manufacturing mode, in which the milling assembly operates to at least partially form the second build component, wherein the coolant supply system controller is configured to selectively direct the coolant to one of the AM assembly and the milling assembly based, at least in part, on the manufacturing mode of the manufacturing system, wherein the coolant supply system further includes one or more coolant valves configured to selectively restrict the flow of the coolant through at least a portion of the coolant supply system, and wherein the coolant supply system controller is configured to actuate at least one of the one or more coolant valves to selectively direct the coolant to the one of the AM assembly and the milling assembly,
wherein the milling assembly includes a milling tool that is configured to at least partially form the second build component, wherein at least one of the one or more coolant valves is a selective output valve that is configured to selectively direct an input flow of the coolant to either of:

(i) a coolant conduit that conveys the coolant to one or more coolant channels extending through the support assembly, or
(ii) a milling tool coolant conduit that directs the coolant to the milling tool, and
wherein the coolant supply system controller is configured to actuate the selective output valve to selectively direct the coolant to the one of the AM assembly and the milling assembly.

2. The manufacturing system of claim 1, wherein the coolant supply system controller is configured such that, when the manufacturing system is in the AM manufacturing mode, the coolant supply system controller actuates the at least one of the one or more coolant valves to direct the coolant to the support assembly to regulate the temperature of the first build component.

3. The manufacturing system of claim 1, wherein the coolant supply system includes the milling tool coolant conduit, wherein the milling tool coolant conduit is configured to supply the coolant to the milling tool to cool the milling tool as the second build component is manufactured, and wherein the coolant supply system controller is configured such that, when the manufacturing system is in the milling manufacturing mode, the coolant supply system controller actuates the at least one of the one or more coolant valves to direct the coolant to the milling tool coolant conduit to regulate a temperature of the milling tool.

4. The manufacturing system of claim 1, further comprising a manufacturing mode sensor that is configured to automatically detect the manufacturing mode of the manufacturing system and to generate and transmit a manufacturing mode signal that is indicative of the manufacturing mode to the coolant supply system controller.

5. The manufacturing system of claim 1, wherein the coolant supply system further includes a build component temperature sensor configured to measure the temperature of the first build component as the first build component is manufactured, wherein the build component temperature sensor is configured to transmit a build component temperature signal that represents the temperature of the first build component to the coolant supply system controller, and wherein the coolant supply system controller is configured to transmit the control signal at least partially responsive to the build component temperature signal.

6. The manufacturing system of claim 5, wherein the build component temperature sensor includes one or more of a non-contact temperature sensor and an infrared temperature sensor.

7. The manufacturing system of claim 1, wherein the coolant supply system further includes a milling tool temperature sensor configured to measure a temperature of the milling tool, wherein the milling tool temperature sensor is configured to generate and transmit a milling tool temperature signal that represents the temperature of the milling tool to the coolant supply system controller, and wherein the coolant supply system controller is configured to generate the control signal at least partially responsive to the milling tool temperature signal.

8. The manufacturing system of claim 1, wherein the support assembly includes a baseplate and an anvil that supports the baseplate, wherein the baseplate is configured to support the first build component such that the first build component is in thermal communication with at least a portion of the support assembly as the first build component is manufactured.

9. The manufacturing system of claim 8, wherein the baseplate includes an upper baseplate member and a lower baseplate member that supports the upper baseplate member, wherein the upper baseplate member and the lower baseplate member are configured to be selectively and repeatedly engaged with one another and removed from one another, and wherein the baseplate further includes a baseplate engagement structure configured to retain the upper baseplate member and the lower baseplate member in a fixed position relative to one another when the upper baseplate member and the lower baseplate member are operatively engaged with one another.

10. The manufacturing system of claim 9, wherein the coolant supply system includes the one or more coolant channels configured to receive the coolant, wherein the coolant is configured to flow through the one or more coolant channels to remove heat from the support assembly, wherein at least one coolant channel is partially defined by each of the upper baseplate member and the lower baseplate member.

11. The manufacturing system of claim 1, wherein the coolant supply system further includes a heat exchanger configured to remove heat from the coolant.

12. A method of operating the manufacturing system of claim 1 during a manufacturing process, the method comprising:
    detecting the manufacturing mode of the manufacturing system;
    forming a build component, which is one of the first build component or the second build component, via the manufacturing process; and
    at least partially concurrent with the forming the build component, selectively supplying the coolant to one or more of:
    (i) the support assembly that supports the build component and that is in thermal communication with the build component; and
    (ii) the milling tool that at least partially forms the build component during the milling process;
    wherein the selectively supplying the coolant is based, at least in part, on the detecting the manufacturing mode.

13. The method of claim 12, wherein the detecting the manufacturing mode includes detecting that the manufacturing system is in the AM manufacturing mode, wherein the forming the build component includes at least partially forming the build component via the AM process, and wherein the selectively supplying the coolant includes flowing the coolant through the support assembly to regulate a temperature of the build component.

14. The method of claim 12, wherein the build component is the first build component, wherein the method further includes detecting that the manufacturing system is in the milling manufacturing mode, wherein the forming includes at least partially forming the second build component via the milling process, and wherein the selectively supplying the coolant includes cooling the milling tool with the coolant.

15. The method of claim 12, wherein the supplying the coolant includes selectively actuating the one or more coolant valves to selectively direct the coolant to the one or more coolant channels extending through the support assembly or to the milling tool coolant conduit that directs the coolant to the milling tool.

16. The method of claim 12, wherein the selectively supplying the coolant is configured to one or more of:
    (i) maintain the temperature of the build component below a predetermined maximum temperature; and
    (ii) maintain the temperature of the build component at least substantially at a predetermined setpoint temperature.

17. The method of claim 12, further comprising:
    removing heat from the coolant; and
    recirculating the coolant through the coolant supply system.

18. The method of claim 12, wherein the selectively supplying the coolant includes selectively modulating a flow rate of the coolant, wherein the selectively modulating the flow rate includes one or more of:
    (i) selectively pumping the coolant with a coolant pump; and
    (ii) selectively actuating the one or more coolant valves to selectively control the flow of the coolant;
    wherein the selectively modulating the flow rate is based, at least in part, on one or more of a measured temperature of the build component and a measured temperature of the coolant.

19. The manufacturing system of claim 1, wherein the coolant supply system further includes a closed coolant loop and a coolant reservoir that contains a volume of the coolant, wherein the coolant is configured to flow repeatedly through the closed coolant loop, and wherein the manufacturing system is configured such that the coolant flows into the coolant reservoir subsequent to being flowed onto the milling tool such that the coolant may be recirculated through the closed coolant loop and subsequently directed to one of the support assembly or the milling tool.

20. A manufacturing system, the manufacturing system comprising:
    an additive manufacturing (AM) assembly configured to at least partially form a first build component via an AM process;
    a milling assembly configured to at least partially form a second build component via a milling process; and
    a coolant supply system configured to selectively supply a coolant to each of the AM assembly and the milling assembly;
    wherein the AM assembly includes a support assembly that supports the first build component and that is in thermal communication with the first build component as the first build component is manufactured, wherein the coolant supply system is configured to remove heat from the support assembly as the first build component is manufactured by flowing the coolant through at least a portion of the support assembly to regulate a temperature of the first build component as the first build component is manufactured,
    wherein the coolant supply system includes a coolant supply system controller configured to generate and transmit a control signal to at least partially control a flow of the coolant through the coolant supply system, wherein the manufacturing system is configured to operate in a manufacturing mode that is one of an AM manufacturing mode, in which the AM assembly operates to at least partially form the first build component, and a milling manufacturing mode, in which the milling assembly operates to at least partially form the second build component, wherein the coolant supply system controller is configured to selectively direct the coolant to the AM assembly or the milling assembly based, at least in part, on the manufacturing mode of the manufacturing system, wherein the coolant supply system further includes one or more coolant valves configured to selectively restrict the flow of the coolant through at least a portion of the coolant supply system, and wherein the coolant supply system controller is configured to actuate at least one of the one or more coolant valves to selectively direct the coolant to the AM assembly or the milling assembly, wherein the support assembly includes a baseplate and an anvil that supports the baseplate, wherein the baseplate is configured to support the first build component such that the first build component is in thermal communication with at least a portion of the support assembly as the first build component is manufactured, and wherein the baseplate includes an upper baseplate member and a lower baseplate member that supports the upper baseplate member, wherein the upper baseplate member and the lower baseplate member are configured to be selectively and repeatedly engaged with one another and removed from one another, and wherein the baseplate further includes a baseplate engagement structure configured to retain the upper baseplate member and the lower baseplate member in a fixed position relative to one another when the upper baseplate member and the lower baseplate member are operatively engaged with one another.

21. A manufacturing system, the manufacturing system comprising:

an additive manufacturing (AM) assembly configured to at least partially form a first build component via an AM process;

a milling assembly configured to at least partially form a second build component via a milling process; and a coolant supply system configured to selectively supply a coolant to each of the AM assembly and the milling assembly;

wherein the AM assembly includes a support assembly that supports the first build component and that is in thermal communication with the first build component as the first build component is manufactured, wherein the coolant supply system is configured to remove heat from the support assembly as the first build component is manufactured by flowing the coolant through at least a portion of the support assembly to regulate a temperature of the first build component as the first build component is manufactured, wherein the coolant supply system includes a coolant supply system controller configured to generate and transmit a control signal to at least partially control a flow of the coolant through the coolant supply system, wherein the manufacturing system is configured to operate in a manufacturing mode that is one of an AM manufacturing mode, in which the AM assembly operates to at least partially form the first build component, and a milling manufacturing mode, in which the milling assembly operates to at least partially form the second build component, wherein the coolant supply system controller is configured to selectively direct the coolant to the AM assembly or the milling assembly based, at least in part, on the manufacturing mode of the manufacturing system, wherein the coolant supply system further includes one or more coolant valves configured to selectively restrict the flow of the coolant through at least a portion of the coolant supply system, and wherein the coolant supply system controller is configured to actuate at least one of the one or more coolant valves to selectively direct the coolant to the AM assembly or the milling assembly, and wherein the milling assembly includes a milling tool that is configured to at least partially form the second build component, wherein the coolant supply system further includes a closed coolant loop and a coolant reservoir that contains a volume of the coolant, wherein the coolant is configured to flow repeatedly through the closed coolant loop, and wherein the manufacturing system is configured such that the coolant flows into the coolant reservoir subsequent to being flowed onto the milling tool such that the coolant may be recirculated through the closed coolant loop and subsequently directed to one of the support assembly or the milling tool.

* * * * *